US008554988B2

(12) United States Patent
Kitahara

(10) Patent No.: US 8,554,988 B2
(45) Date of Patent: Oct. 8, 2013

(54) FLASH MEMORY MODULE AND STORAGE SYSTEM

(75) Inventor: Jun Kitahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/440,792

(22) Filed: Apr. 5, 2012

(65) Prior Publication Data

US 2012/0191906 A1 Jul. 26, 2012

Related U.S. Application Data

(62) Division of application No. 12/168,269, filed on Jul. 7, 2008, now Pat. No. 8,156,277.

(30) Foreign Application Priority Data

May 21, 2008 (JP) ................................ 2008-133098

(51) Int. Cl.
*G06F 13/14* (2006.01)

(52) U.S. Cl.
USPC ............ 711/103; 710/26; 711/156; 711/203; 711/206

(58) Field of Classification Search
USPC .................... 711/103, 203, 206, 156; 710/26
See application file for complete search history.

(56) References Cited

U.S. PATENT DOCUMENTS 5,404,485 A * 4/1995 Ban .............................. 711/202
5,742,818 A * 4/1998 Shoroff et al. ....................... 1/1
6,477,612 B1 * 11/2002 Wang ............................... 711/2
2005/0144368 A1 * 6/2005 Chung et al. ................. 711/103
2005/0228963 A1 10/2005 Rothman et al.
2006/0288153 A1 12/2006 Tanaka et al.
2012/0151124 A1 * 6/2012 Baek et al. ................... 711/103

* cited by examiner

*Primary Examiner* — Jae Yu
(74) *Attorney, Agent, or Firm* — Sughrue Mion, PLLC

(57) ABSTRACT

A storage controller manages address conversion information denoting the correspondence relationship between a logical address and a physical address of storage area (for example, a physical block) inside a flash memory. The storage controller uses the above-mentioned address conversion information to specify a physical address corresponding to a logical address specified by an I/O request from a higher-level device, and sends an I/O command including I/O-destination information based on the specified physical address to a memory controller inside a flash memory module. The memory controller carries out the I/O with respect to a storage area inside a flash memory specified from the I/O-destination information of the I/O command from the storage controller.

16 Claims, 17 Drawing Sheets

| | |
|---|---|
| 1301 — READ COMMAND | |
| 1302 — BLOCK NUMBER | PAGE NUMBER |
| BLOCK NUMBER | PAGE NUMBER |
| : | |
| BLOCK NUMBER | PAGE NUMBER |
| 1304 — DELETE COMMAND | |
| 1305 — BLOCK NUMBER | |
| 1306 — WRITE COMMAND | |
| 1307 — BLOCK NUMBER | |

1300

| | |
|---|---|
| 1401 — READ COMMAND | |
| 1402 — BLOCK NUMBER | PAGE NUMBER |
| BLOCK NUMBER | PAGE NUMBER |
| : | |
| BLOCK NUMBER | PAGE NUMBER |
| 1404 — DELETE COMMAND | |
| 1405 — BLOCK NUMBER | |
| : | |
| BLOCK NUMBER | |
| 1406 — WRITE COMMAND | |
| 1407 — BLOCK NUMBER | |
| : | |
| BLOCK NUMBER | |

1400

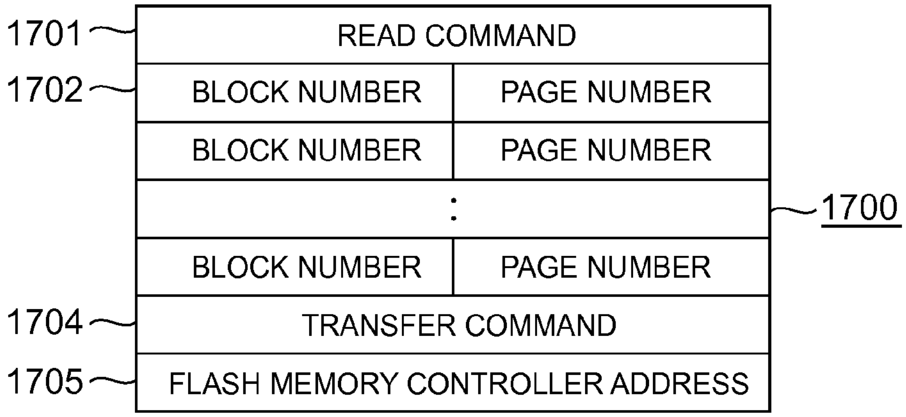

FIG. 17

| | | |
|---|---|---|
| 1701 — | READ COMMAND | |
| 1702 — | BLOCK NUMBER | PAGE NUMBER |
| | BLOCK NUMBER | PAGE NUMBER |
| | : | |
| | BLOCK NUMBER | PAGE NUMBER |
| 1704 — | TRANSFER COMMAND | |
| 1705 — | FLASH MEMORY CONTROLLER ADDRESS | |

~1700

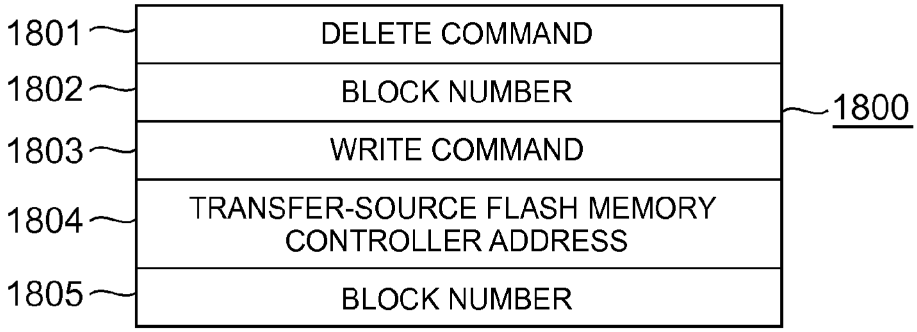

FIG. 18

| | |
|---|---|
| 1801 — | DELETE COMMAND |
| 1802 — | BLOCK NUMBER |
| 1803 — | WRITE COMMAND |
| 1804 — | TRANSFER-SOURCE FLASH MEMORY CONTROLLER ADDRESS |
| 1805 — | BLOCK NUMBER |

~1800

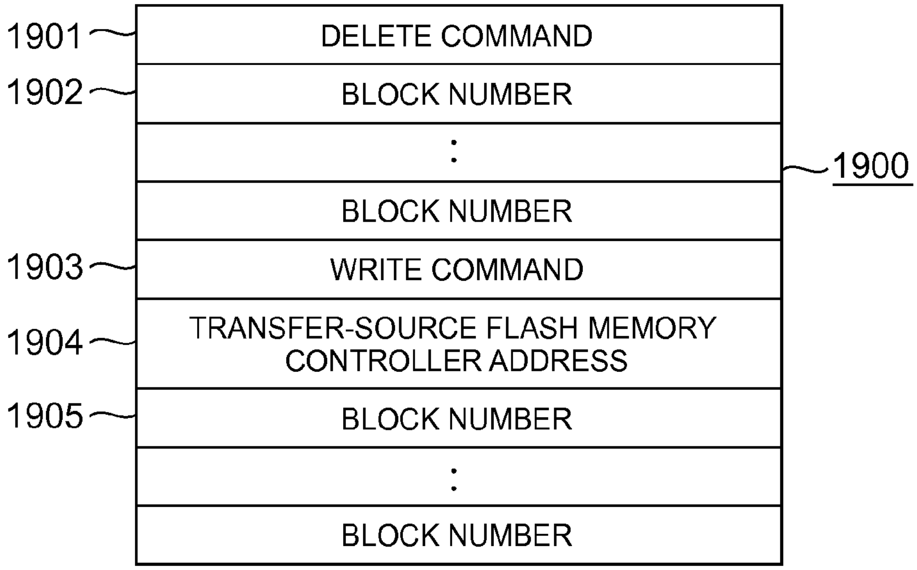

FIG. 19

| | |
|---|---|
| 1901 — | DELETE COMMAND |
| 1902 — | BLOCK NUMBER |
| | : |
| | BLOCK NUMBER |
| 1903 — | WRITE COMMAND |
| 1904 — | TRANSFER-SOURCE FLASH MEMORY CONTROLLER ADDRESS |
| 1905 — | BLOCK NUMBER |
| | : |
| | BLOCK NUMBER |

| | | | | |
|---|---|---|---|---|
| LOGICAL ADDRESS RANGE a | FLASH MEMORY CONTROLLER ADDRESS a | BLOCK NUMBER a<br>FLASH MEMORY CHIP ADDRESS a | UPDATE PAGE MAP a | UPDATE BLOCK ADDRESS a<br>FLASH MEMORY CONTROLLER ADDRESS a' / BLOCK NUMBER a' |
| LOGICAL ADDRESS RANGE b | FLASH MEMORY CONTROLLER ADDRESS b | BLOCK NUMBER b<br>FLASH MEMORY CHIP ADDRESS b | UPDATE PAGE MAP b | UPDATE BLOCK ADDRESS b<br>FLASH MEMORY CONTROLLER ADDRESS b' / BLOCK NUMBER b' |
| LOGICAL ADDRESS RANGE c | FLASH MEMORY CONTROLLER ADDRESS c | BLOCK NUMBER c<br>FLASH MEMORY CHIP ADDRESS c | UPDATE PAGE MAP c | UPDATE BLOCK ADDRESS c<br>FLASH MEMORY CONTROLLER ADDRESS c' / BLOCK NUMBER c' |
| | | : | | |
| LOGICAL ADDRESS RANGE d | FLASH MEMORY CONTROLLER ADDRESS d | BLOCK NUMBER d<br>FLASH MEMORY CHIP ADDRESS d | UPDATE PAGE MAP d | UPDATE BLOCK ADDRESS d<br>FLASH MEMORY CONTROLLER ADDRESS d' / BLOCK NUMBER d' |

FIG. 22

| | | | | |
|---|---|---|---|---|
| UPDATE BLOCK ADDRESS a | WRITE LOCATION INFORMATION | FLASH MEMORY CONTROLLER ADDRESS d' | BLOCK NUMBER d' | PAGE NUMBER 1 |
| | | FLASH MEMORY CONTROLLER ADDRESS d' | BLOCK NUMBER d' | PAGE NUMBER 2 |
| | | FLASH MEMORY CONTROLLER ADDRESS d' | BLOCK NUMBER d' | PAGE NUMBER 2 |
| | | FLASH MEMORY CONTROLLER ADDRESS d' | BLOCK NUMBER d' | PAGE NUMBER 1 |
| | | | : | |
| | | FLASH MEMORY CONTROLLER ADDRESS e' | BLOCK NUMBER c' | PAGE NUMBER 3 |
| UPDATE BLOCK ADDRESS b | WRITE LOCATION INFORMATION | FLASH MEMORY CONTROLLER ADDRESS a' | BLOCK NUMBER a' | PAGE NUMBER 3 |
| | | FLASH MEMORY CONTROLLER ADDRESS a' | BLOCK NUMBER a' | PAGE NUMBER 2 |
| | | FLASH MEMORY CONTROLLER ADDRESS a' | BLOCK NUMBER a' | PAGE NUMBER 2 |
| | | FLASH MEMORY CONTROLLER ADDRESS a' | BLOCK NUMBER a' | PAGE NUMBER 1 |
| | | | : | |
| | | FLASH MEMORY CONTROLLER ADDRESS a' | BLOCK NUMBER a' | PAGE NUMBER 1 |
| UPDATE BLOCK ADDRESS c | WRITE LOCATION INFORMATION | FLASH MEMORY CONTROLLER ADDRESS b' | BLOCK NUMBER b' | PAGE NUMBER 1 |
| | | FLASH MEMORY CONTROLLER ADDRESS b' | BLOCK NUMBER b' | PAGE NUMBER 2 |
| | | FLASH MEMORY CONTROLLER ADDRESS b' | BLOCK NUMBER b' | PAGE NUMBER 2 |
| | | FLASH MEMORY CONTROLLER ADDRESS b' | BLOCK NUMBER b' | PAGE NUMBER 1 |
| | | | : | |
| | | FLASH MEMORY CONTROLLER ADDRESS b' | BLOCK NUMBER b' | PAGE NUMBER 3 |
| | | : | | |
| UPDATE BLOCK ADDRESS d | WRITE LOCATION INFORMATION | FLASH MEMORY CONTROLLER ADDRESS c' | BLOCK NUMBER a' | PAGE NUMBER 1 |
| | | FLASH MEMORY CONTROLLER ADDRESS c' | BLOCK NUMBER a' | PAGE NUMBER 2 |
| | | FLASH MEMORY CONTROLLER ADDRESS c' | BLOCK NUMBER a' | PAGE NUMBER 2 |
| | | FLASH MEMORY CONTROLLER ADDRESS c' | BLOCK NUMBER a' | PAGE NUMBER 1 |
| | | | : | |
| | | FLASH MEMORY CONTROLLER ADDRESS f' | BLOCK NUMBER b' | PAGE NUMBER 3 |

FLASH MEMORY MODULE AND STORAGE SYSTEM

CROSS-REFERENCE TO PRIOR APPLICATION

This is a Divisional of application Ser. No. 12/168,269 filed Jul. 7, 2008, claiming priority based on Japanese Patent Application No. 2008-133098, filed on May 21, 2008, the contents of all of which are incorporated herein by reference in their entirety.

BACKGROUND

The present invention generally relates to a flash memory module that comprises a memory controller and a flash memory, and to a storage system that comprises the flash memory module.

For example, as a storage system that comprises a flash memory module, there is the storage system disclosed in US Patent Application Publication No. 2006/0288153. According to US Patent Application Publication No. 2006/0288153, a memory controller inside the flash memory module carries out a wear leveling process and a reclamation process.

SUMMARY

The storage system comprises a plurality of flash memory modules, and a higher-level controller (hereinafter referred to as "storage controller") that manages the plurality of flash memory modules. The storage controller, for example, receives an I/O request from a higher-level device (for example, a host computer or another storage system) and accesses one or more flash memory modules of the plurality of flash memory modules in accordance with this I/O request.

Generally speaking, a SSD (Solid State Drive) is known as a flash memory module. For example, a NAND-type flash memory is mounted in a SSD. In a NAND-type flash memory, the reading and writing of data is carried out in page units, and data deletion is carried out in block units. It will become impossible to use block units in a NAND-type flash memory.

Flash memory management is carried out by a memory controller inside the SSD. Thus, a storage controller that is at a higher level than the SSD cannot exercise control that recognizes a block of flash memory.

Further, the SSD is compatible with a hard disk drive (HDD) interface, but there is no interface for communications between SSD.

Accordingly, an object of the present invention is to make it possible for a storage controller to exercise control that recognizes a flash memory storage area.

Another object of the present invention is to make it possible for flash memory modules to exchange data.

Other objects of the present invention should become clear from the explanations given hereinbelow.

The storage controller manages address conversion information denoting the correspondence relationship between a logical address and a physical address of storage area (for example, a physical block) inside the flash memory. The storage controller uses the above-mentioned address conversion information to specify a physical address corresponding to a logical address specified by an I/O request from a higher-level device, and sends an I/O command including I/O-destination information based on the specified physical address to a memory controller inside a flash memory module. The memory controller carries out the I/O with respect to a storage area inside a flash memory specified from the I/O-destination information of the I/O command from the storage controller.

In addition to a first switching mechanism to which both the storage controller and plurality of flash memory modules are connected, the preferred embodiment also comprises a second switching mechanism to which the plurality of flash memory modules are connected, but to which the storage controller is not connected. The transfer of data between the flash memory modules is carried out via the second switching mechanism.

BRIEF DESCRIPTION OF THE DRAWINGS

FIG. 17 shows a transfer-source reclamation command issued in a reclamation process with the second module;

FIG. 18 shows a transfer-destination reclamation command issued in a reclamation process with the first module;

FIG. 19 shows a transfer-destination reclamation command issued in a reclamation process with the second module;

FIG. 21 shows an example of the configuration of a first management table; and FIG. 22 shows an example of the configuration of a second management table.

DESCRIPTION OF THE PREFERRED EMBODIMENTS

Figure 1:
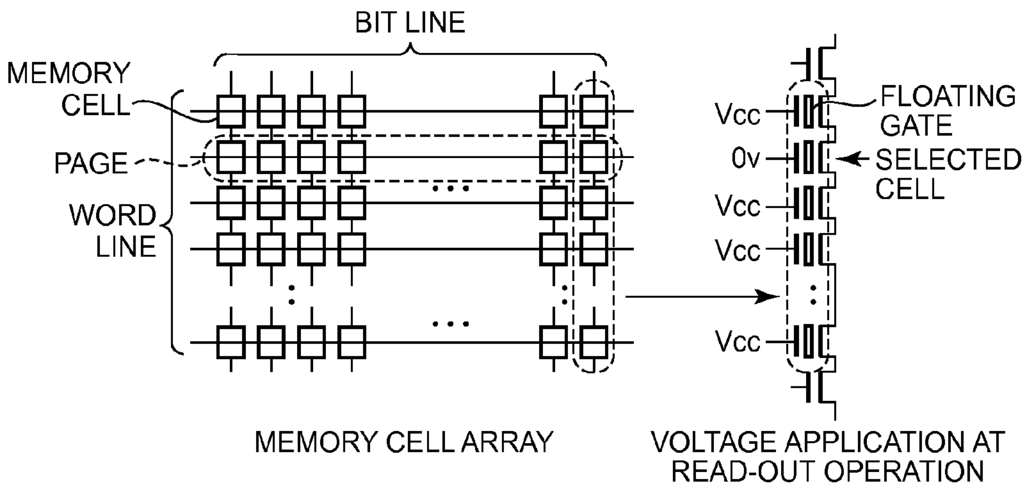
FIG. 1 is a schematic diagram of a portion of a memory cell array of a NAND-type flash memory.

A number of embodiments of the present invention will be explained below by referring to the drawings.

Embodiment 1

Figure 20:
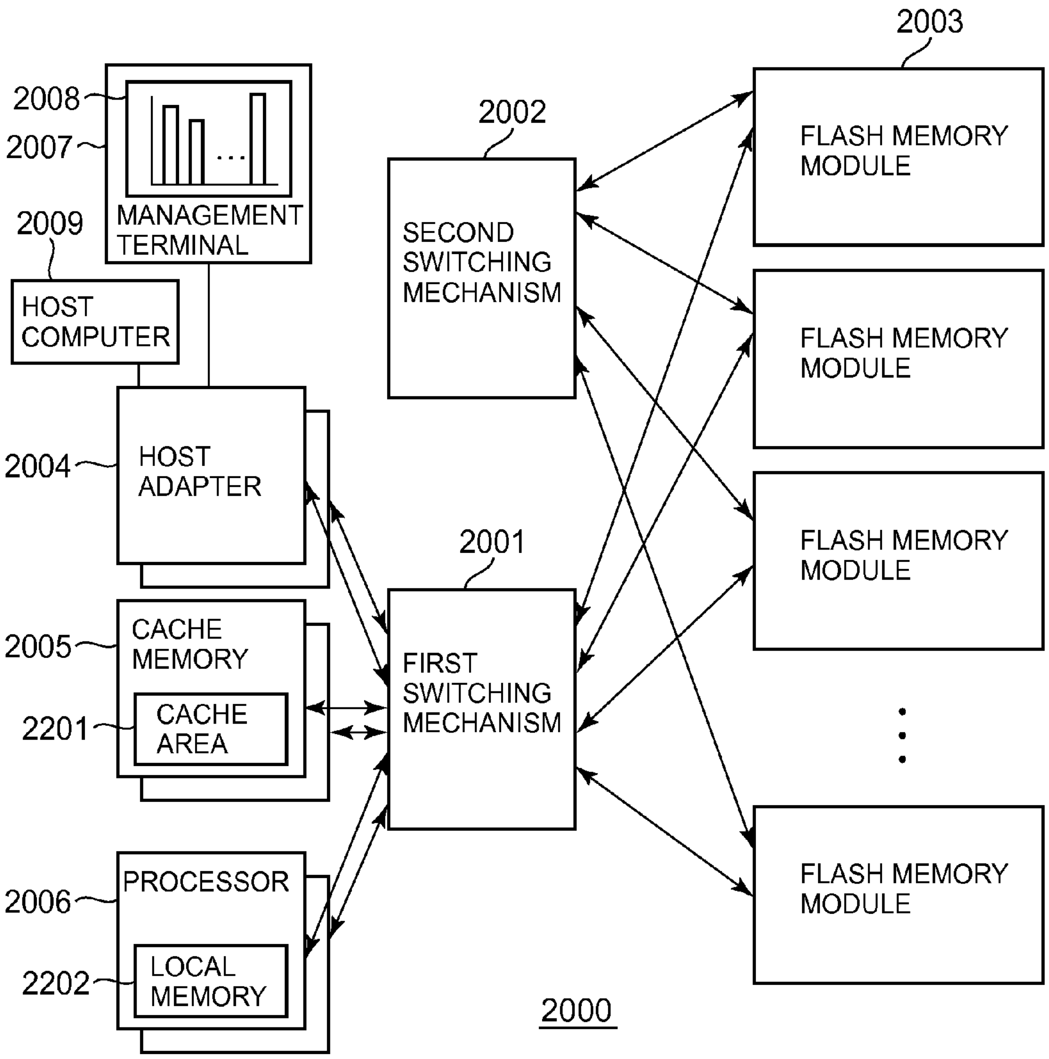
FIG. 20 shows an example of the configuration of a storage system related to the first embodiment of the present invention.

FIG. 20 shows the configuration of a storage system related to the first embodiment of the present invention.

A storage system 2000 comprises a plurality of flash memory modules 2003, and a storage controller, which is at a higher level than the plurality of flash memory modules.

Figure 3:
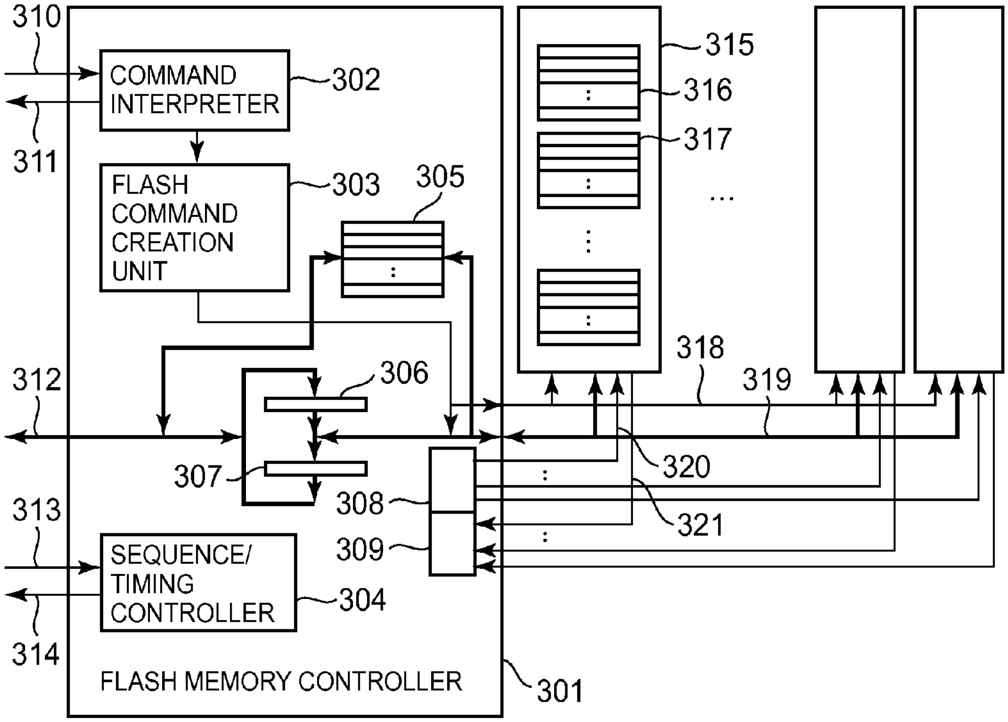
FIG. 3 shows an example of the configuration of a flash memory module.

The respective flash memory modules 2003, for example, have a plurality of NAND-type flash memory chips, and a flash memory controller 301 (refer to FIG. 3). Therefore, in a flash memory module 2003, the reading and writing of data are carried out in page units, and the deletion of data is carried out in block units. In the following explanation, data that is stored in one page will be called a "data element", and data that is stored in one block configured with a plurality of pages will be called a "data element group". Further, a block, which is specified from an address specified in an I/O request received from a host computer 2009 as the higher-level device of the storage system, may be called a "logical block". A physical block allocated to the logical block may be called the "source block". When a first data element stored in a first physical page inside the source block is updated to a second data element, the second data element is written to a second physical page inside a different physical block that is allocated to the source block, and the above-mentioned first physical page inside the source block may be called the "source page", the above-mentioned first data element may be called the "source data element", the above-mentioned physical block may be called the "update block", the above-mentioned second physical page inside the update block may be called the "update page", and the above-mentioned second data element may be called the "update data element". The latest data element corresponding to the logical page inside the logical block will be called the "valid data element". If the source data element is not updated, the valid data element is this source data element, and if the update data element corresponding to the source data element exists in the update block, the valid data element is this update data element.

A RAID Group is configured with two or more flash memory modules 2003 of the plurality of flash memory modules 2003 (RAID is the abbreviation for Redundant Array of Independent (or Inexpensive) Disks). The RAID Group is also called the parity group. A plurality of logical volumes are created by logically partitioning one or a plurality of storage spaces provided by one or a plurality of RAID Groups. At least one of the plurality of logical volumes is provided to the host computer 2009 serving as the higher-level device of the storage system 2000. A storage controller receives an I/O request (write request or read request) that specifies a logical volume from the host computer 2009, and in response to this I/O request, either writes the write-targeted data to the logical volume specified in this I/O request (write request), or reads out the read-target data from the logical volume specified in this I/O request (read request). The writing of write-targeted data to the logical volume signifies that a data element, which constitutes the basis of the write-targeted data, is written to one or a plurality of pages corresponding to the logical address denoting the write destination thereof. Further, the reading of read-targeted data from the logical volume signifies that a valid data element, which constitutes the basis of the read-targeted data, is read from one or a plurality of pages corresponding to the logical address denoting the read-source thereof.

The storage controller, for example, is configured with a host adapter 2004; cache memory 2005; and processor 2006. The host adapter 2004, cache memory 2005 and processor 2006 are multiplexed (for example, duplexed). The host adapter 2004, cache memory 2005, processor 2006, and the plurality of flash memory modules 2003 are connected to a first switching mechanism 2001.

The first switching mechanism 2001 is configured with one or a plurality of switching devices. Communications between flash memory modules 2003, host adapters 2004, cache memories 2005 and processors 2006 is carried out through the first switching mechanism 2001.

The cache memory 2005 temporarily stores write-targeted data written to the logical volume, and read-targeted data read-out from the logical volume. The cache memory 2005 is accessible from multiplexed processors 2006 (that is, a plurality of processors 2006). Information related to a plurality of flash memories inside the plurality of flash memory modules 2003 (hereinafter referred to as "flash management information") is stored in the cache area 2201, which is one part of the storage area of the cache memory 2005. Since the addresses of the logical blocks of the logical volume (logical address range) are specified in an I/O request received by the host adapter 2004 from the host computer 2009, it is necessary to manage the page in which a data element corresponding to the logical address range is stored, but flash management information comprises address conversion information denoting the correspondence relationship between the logical address range and the physical address. The processor 2006 can access a page or block inside a desired flash memory with the address conversion information. The address conversion information, for example, comprises a first management table, which is shown in FIG. 21, and a second management table, which is shown in FIG. 22. The correspondence relationship between the logical address range and general physical addresses is managed by the first management table, and the correspondence relationship between the general physical addresses and the detailed physical addresses is managed by the second management table.

More specifically, a general physical address is associated with each logical address range in the first management table as shown in FIG. 21. A general physical address, for example, is configured with a flash memory controller address, block number, update page map, and update block address. The logical address range is the logical block address. To specify the source block that corresponds to this logical block, the number of this source block is associated with the address of the flash memory controller capable of accessing this source block. The flash memory chip address, which comprises the source block, is inside the block number, and also comprises an address specifiable by the flash memory controller capable of accessing this source block. The update page map is a map (for example, a bitmap) showing the location of a source page (that is, an updated page) inside the source block. The update block address is the address of the update block allocated to the source block corresponding to a logical block identified from the logical address range. The update block address, for example, is configured with the flash memory controller address and the block number.

Write location information and source page information are recorded for each update block address in the second management table as shown in FIG. 22. The write location information is information denoting the page up to which the update block is constituted of update pages (pages into which update data elements are written). The source page information is information for identifying a source page, and is information that is associated with each update page. The source page information, for example, is configured with a page number corresponding to the source page, the number of the source block having this source page, and the address of the flash memory controller that accesses this source block.

From the above, the address conversion information configured in the first and second management tables can be called information that shows the location of the physical page in which is stored a valid data element corresponding to a logical page inside the logical block. For example, if the source page information related to the source page corresponding to a certain logical page is not associated with the update block allocated to the source block comprising this source page, the processor 2006 knows that the data element stored in this source page is the valid data element corresponding to the certain logical page. Conversely, if the above-mentioned source page information is associated with the above-mentioned update block, the processor 2006 knows that the update data element, which is stored in the update page with the address that is the most posterior of the one or more update pages with which this source page is associated, is the valid data element corresponding to the above-mentioned certain logical page. For example, when reading out the valid data element corresponding to the above-mentioned certain logical page, the processor 2006 creates an read command in page units that has I/O-destination information denoting the source page or update page that is to store this valid data element, and sends this read command to the flash memory controller (refer to FIG. 3) inside the flash memory module 2003 having the source page or update page. Consequently, this flash memory controller executes a single page read operation, which will be explained below by referring to FIG. 4. As described hereinabove, since the I/O command sent from the processor 2006 to the flash memory module 2003 has I/O-destination information denoting the physical page that is to be the I/O destination, there is no need to hold information denoting the correspondence relationship of a logical address and a physical address inside the flash memory module 2003. Thus, the flash memory controller described below is not required to have an address conversion function that specifies a physical address from a logical address.

Refer to FIG. 20 once again. The host adapter 2004 receives an I/O request from the host computer 2009, and transfers the I/O request to the processor 2006 by way of the first switching mechanism 2001. Further, when the received I/O request is a write request, the host adapter 2004 writes the write-targeted data to the cache memory 2005. Further, when the received I/O request is a read request, the host adapter 2004 reads out from the cache memory 2005 the read-targeted data that is stored in the cache memory 2005, and sends the read-out read-targeted data to the host computer 2009. In addition to the host computer 2009, a management terminal 2007 is connected to the host adapter 2004 as shown in the figure. For example, the states related to the plurality of flash memory chips of the plurality of flash memory modules 2003 are displayed on the display screen 2008 of the management terminal 2007. Information denoting these states (hereinafter referred to as "flash memory status information"), for example, is accumulated in a prescribed storage resource (for example, the cache memory 2005). The processor 2006 sends the flash memory status information to the management terminal 2007 by way of the host adapter 2004, and the management terminal 2007 displays the states represented by this information. The displayed states, for example, can include a state specified from the first management table and/or the second management table, or which flash memory chip inside which flash memory module has a defective block.

The processor 2006 processes the I/O request from the host adapter 2004. More specifically, the processor 2006 specifies the below-described physical address corresponding to a logical address specified from this I/O request, and sends an I/O command, which has I/O-destination information based on this physical address, to the flash memory controller (for example, refer to FIG. 3) that is capable of accessing the flash memory chip having the storage area specified from this I/O-destination information. Further, the processor 2006 creates and issues a reclamation command, which will be described in detail further below. Copies of required parts of the above-described first and second management tables (refer to FIGS. 21 and 22) are used in the creation of the I/O command and the creation of the reclamation command. The copies of these required parts, for example, are stored in the local memory 2202 of the processor 2006. Furthermore, the I/O destination storage area is a physical page. This is because reading and writing are carried out in page units. Therefore, the I/O-destination information included in the I/O command, for example, comprises the page number of the physical page corresponding to the I/O destination area, the number of the physical block including this physical page, and the address of the flash memory controller 301 capable of accessing this physical block. That is, the I/O command is issued in page units. Conversely, a delete command is issued from the processor 2006 in block units. The delete command includes the number of delete-targeted physical block.

The storage system 2000 comprises a second switching mechanism 2002 in addition to the first switching mechanism 2001. The second switching mechanism 2002 is configured with one or a plurality of switching devices. The plurality of flash memory modules 2003 are connected to the second switching mechanism 2002, but the host adapter 2004, cache memory 2005 and processor 2006 are not connected to the second switching mechanism 2002. That is, the second switching mechanism 2002 is a dedicated switching mechanism for communications between the flash memory modules 2003. Connecting the flash memory modules 2003 to the second switching mechanism 2002 makes it possible to extend the flash memory modules 2003 into a tree-like structure.

FIG. 3 shows the configuration of a flash memory module 2003.

The flash memory module 2003 is a module comprising a flash memory controller 301 as a memory controller, and a plurality (or one) of flash memory chips 315, which are the flash memories connected to this flash memory controller 301.

The flash memory chip 315 is configured with a plurality of physical blocks 316. One physical block 316 is configured with a plurality of (for example, 64) physical pages 317.

The plurality of flash memory chips 315, which share a data bus 319 and control signal line 318, are connected to the flash memory controller 301. The data bus 319 is a bus over which data elements flow. The control signal line 318 is the line over which the control signals flow.

In addition to the control signal line 318, the line that links the flash memory controller 301 to the respective flash memory chips 315 can include a line over which a chip selection signal flows, and a line 321 over which a busy signal flows. Lines 320 and 321 are independently connected to each flash memory chip 315.

Figure 9:
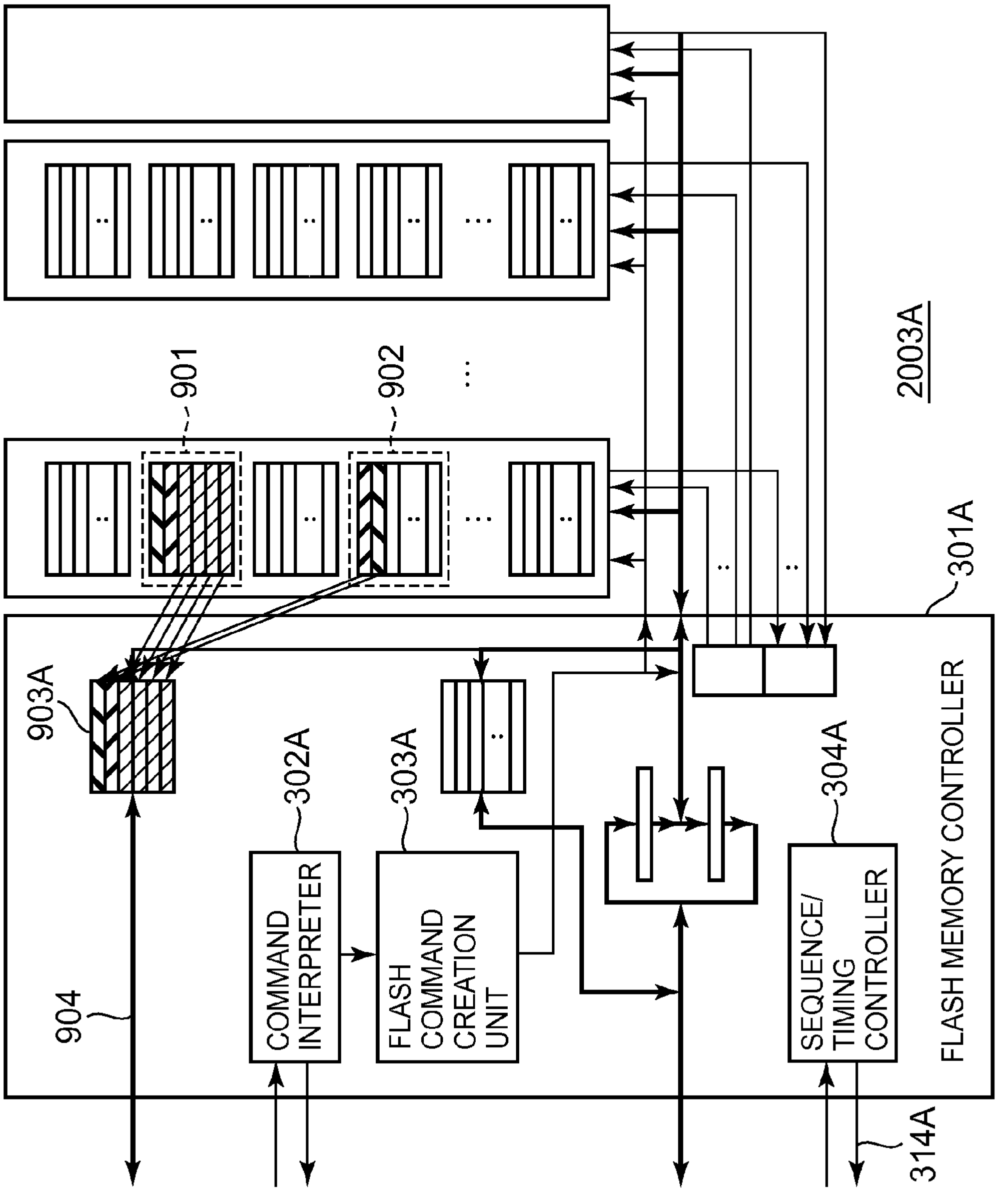
FIG. 9 shows a transfer-source flash memory module in a reclamation process with the first module.
Figure 10:
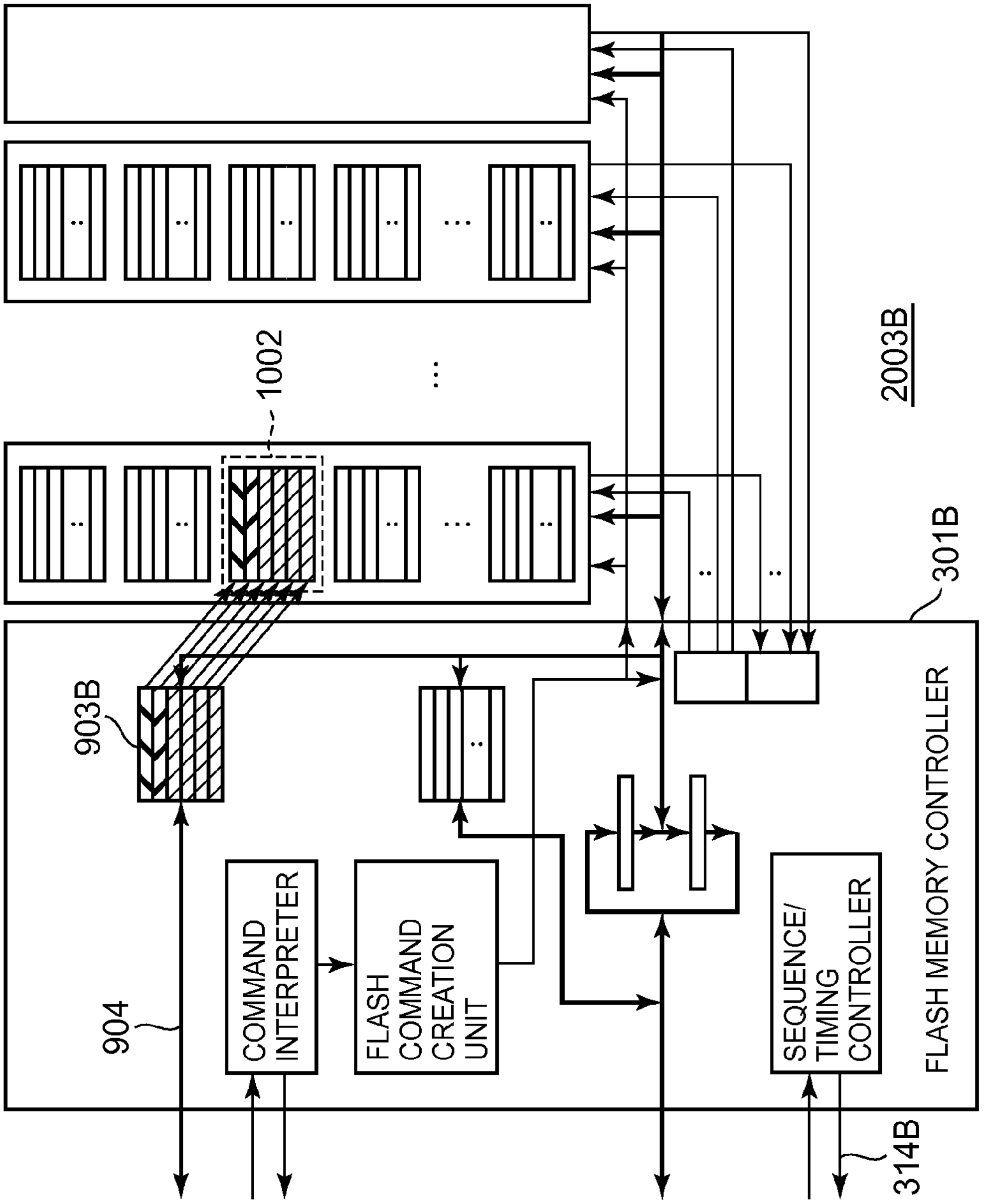
FIG. 10 shows a transfer-destination flash memory module in a reclamation process with the first module.

The flash memory controller 301 comprises a command interpreter 302, a flash command creation unit 303, a first block buffer 305, a sequence/timing controller 304, a first page buffer 306; a second page buffer 307, a chip selector 308, and a busy signal monitoring unit 309. The flash memory controller 301 is connected to the first switching mechanism 2001 (refer to FIG. 20) by way of a first data bus 312. Further, although not shown in FIG. 3, the flash memory controller 301 further comprises a second block buffer 903 as shown in FIGS. 9 and 10 (in FIGS. 9 and 10, 903A and 903B are disclosed for distinguishing between the transfer source and the transfer destination). The flash memory controller 301 is connected to the second switching mechanism 2002 (refer to FIG. 20) by way of a second data bus 904. The signals that the flash memory controller 301 receives from the processor 2006, for example, can include a command 310 and a boot signal 313. The signals that the flash memory controller 301 sends to the processor 2006, for example, can include a status 311 and a status signal 314. The boot signal 313 is the signal for booting up the flash memory controller 301. The status signal 314 is the signal showing the state of the flash memory controller 301 (for example, in operation or operation ended).

The command interpreter 302 interprets the command 310 from the processor 2006, and communicates the result of interpretation to the flash command creation unit 303. Further, the command interpreter 302 sends the status 311 to the processor 2006.

The flash command creation unit 303 creates a command (hereinafter referred to as "flash command") for a flash memory chip 315 based on the result of the interpretation in the command interpreter 302. The flash command, for example, is sent to the target flash memory chip 315 via the control signal line 318. There are three types of flash commands, for example, read, write and delete. Read and write flash commands are issued in page units, and a delete flash command is issued in block units. Data elements that accord with read and write flash commands go by way of the data bus 319.

The first block buffer 305 is the buffer used when carrying out reclamation inside the flash memory module 2003 that has the buffer 305. The first block buffer 305 stores a valid data element read out from an update page inside an update block, and a valid data element read out from a source page inside N source blocks (N being a natural number) allocated to the update block. Therefore, the storage capacity of the first block buffer 305 must be at least N-blocks worth of storage capacity.

The sequence/timing controller 304 controls the operating sequence and the timing of the respective signals of the flash memory controller 301. The sequence/timing controller 304 receives a boot signal 313 from the processor 2006 and boots up the flash memory controller 301, or sends a status signal 314 to the processor 2006.

The first page buffer 306 is the buffer used when writing a data element to a physical page 317. More specifically, the first page buffer 306 stores the data element to be written to the physical page 317. The storage capacity of the first page buffer 306 is one physical page worth of storage capacity.

The second page buffer 307 is the buffer used when reading a data element from a physical page 317. More specifically, the second page buffer 307 stores the data element read out from the physical page 317. The storage capacity of the second page buffer 307 is also one physical page worth of storage capacity.

The chip selector 308 selects the flash memory chip 315 that constitutes the destination of a flash command on the basis of the flash command.

The busy signal monitoring unit 309 monitors the presence of a busy signal from a flash memory chip 315.

The second block buffer 903 shown in FIG. 9 is the buffer used when reclamation is carried out between the flash memory module 2003 that has the buffer 903 and a different flash memory module 2003. The second block buffer 903 stores a valid data element read out from an update page inside the update block, and a valid data element read out from a source page inside M source blocks (M being a natural number) allocated to the update block. Therefore, the storage capacity of the second block buffer 903 must be at least M-blocks worth of storage capacity. The value of M and the value of N mentioned hereinabove can be the same value or different values. That is, the number of source blocks allocated to a certain update block and the number of source blocks allocated to a different update block can either be the same or different. A valid data element group stored in the second block buffer 903 is transferred to a flash memory controller 301 inside a different flash memory module 2003 by way of the second data bus 904 and the second switching mechanism 2002 (refer to FIG. 20). Further, the valid data element group received from the flash memory controller 301 inside the different flash memory module 2003 by way of the second data bus 904 and second switching mechanism 2002 (refer to FIG. 20) is written to the second block buffer 903.

Figure 2:
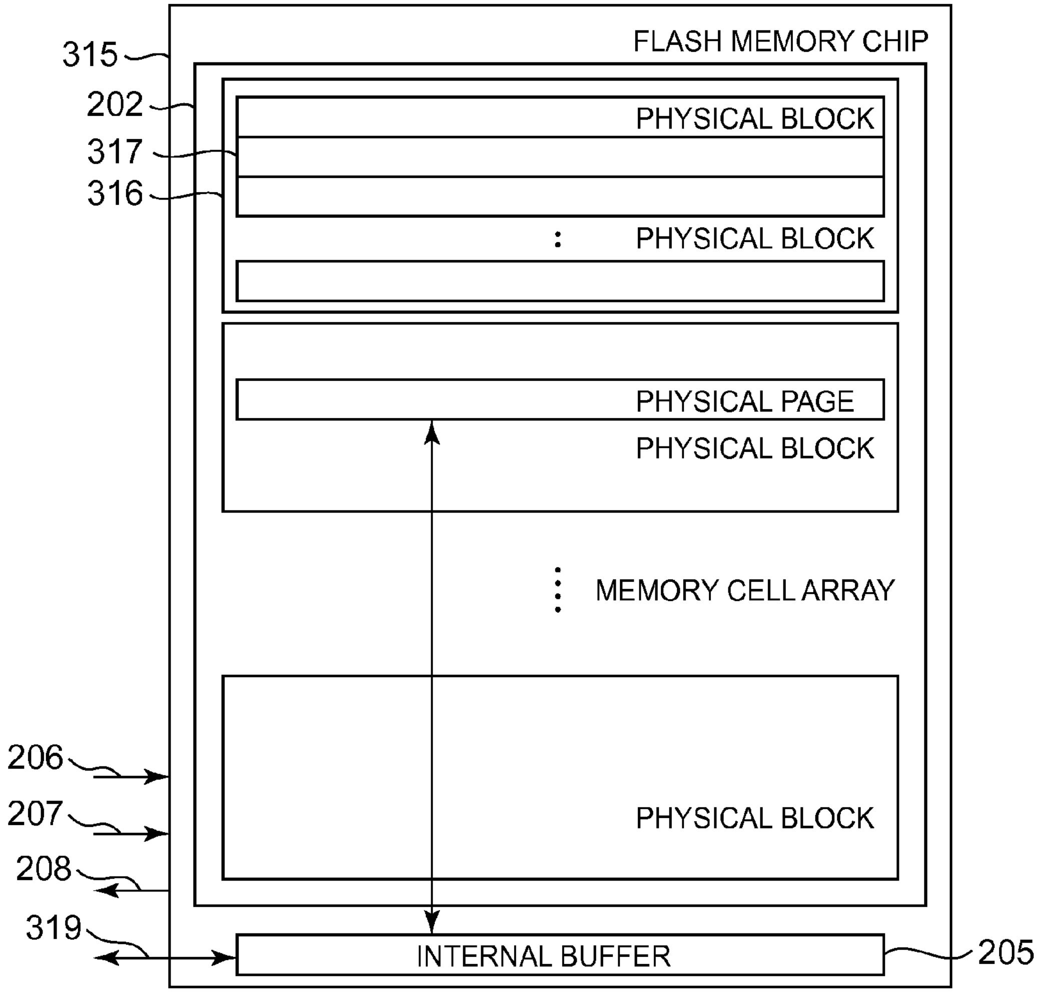
FIG. 2 shows an example of the configuration of a flash memory chip.

FIG. 2 shows the configuration of a flash memory chip 315.

The flash memory chip 315 comprises a memory cell array 202, and an internal buffer 205 having one or two physical pages worth of storage capacity. Data elements are transferred between the memory cell array 202 and the internal buffer 205, and reading and writing are carried out in page units. Control of the flash memory chip 315 is carried out using a chip selection signal 206, a plurality of control signals 207 that identify information placed on the data bus 319, and a busy signal 208 that shows the chip 315 is in operation.

The memory cell array 202 is partitioned into a plurality of physical blocks 316. Further, the respective physical blocks 316 are configured with a plurality of physical pages 317.

For example, FIG. 1 shows one part of a memory cell array 202. FIG. 1 is a diagram showing an example in which 16896 memory cells are lined up in the horizontal direction, and 16 memory cells are lined up in the vertical direction. A page, which is the unit used for reading and writing, is configured by a memory cell group configuring one row in the horizontal direction. In one vertical row, 16 FET (Field Effect Transistors) comprising floating gates are connected in series. When the memory cells in the vertical direction are treated as a bit line, and memory cells in the horizontal direction are treated as a word line, a page is configured with the memory cells selected in one word line. Further, in FIG. 1, it is supposed that 16 pages worth of memory cells are shown. One physical block, which is a deletion unit, is configured by putting together four memory cell array parts like the one shown in FIG. 1. That is, according to the example of FIG. 1, it is supposed that a physical block is configured with 64 physical pages. Access to a NAND-type flash memory is carried out by providing a command, column address and row address in that order. The row address is configured with a block address and a page address. A block is specified at the higher-level side in the row address, and a page is specified at the lower-level side in the row address.

The various processes carried out by this embodiment will be explained hereinbelow.

Figure 4:
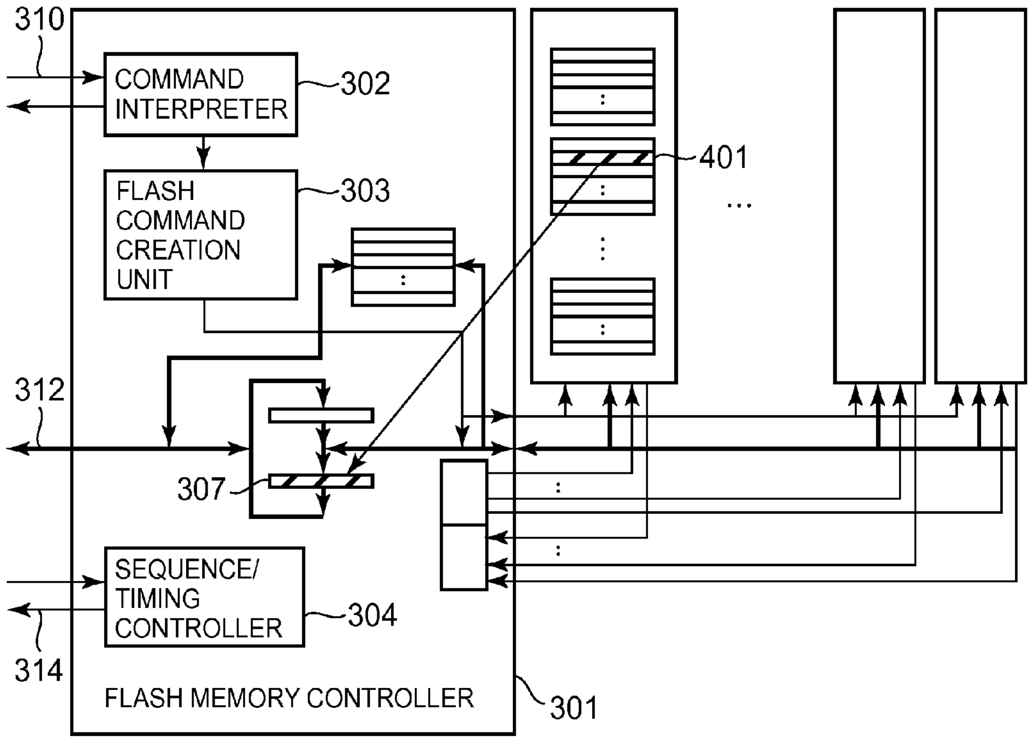
FIG. 4 is a diagram of a single-page read operation.

First, a single-page read-out operation will be explained by using FIG. 4.

The processor 2006 sends a boot signal 313 to the destination flash memory controller 301 of a read command that specifies a read-source physical page, and, in addition, sends this read command 310 to the flash memory controller 301. The command interpreter 302 receives the command 310, and specifies the command 310 to be a read command. The flash command creation unit 303 creates a read flash command that corresponds to the read command 310. The read flash command includes address information comprising the following (4-1) to (4-3):

(4-1) number of the read-source physical page 401;

(4-2) number of the physical block including the physical page 401; and (4-3) number of the flash memory chip including the physical block.

The read flash command created by the flash command creation unit 303 is sent to the flash memory chip specified from the above-mentioned (4-3). In response to this, a data element is read out from the read-source physical page 401, and the read-out data element is transferred to the second page buffer 307. Then, this data element is transferred from the second page buffer 307 to the processor 2006 by way of the first data bus 312. A status signal 314, which denotes read end, is sent to the processor 2006 from the sequence/timing controller 304.

Figure 5:
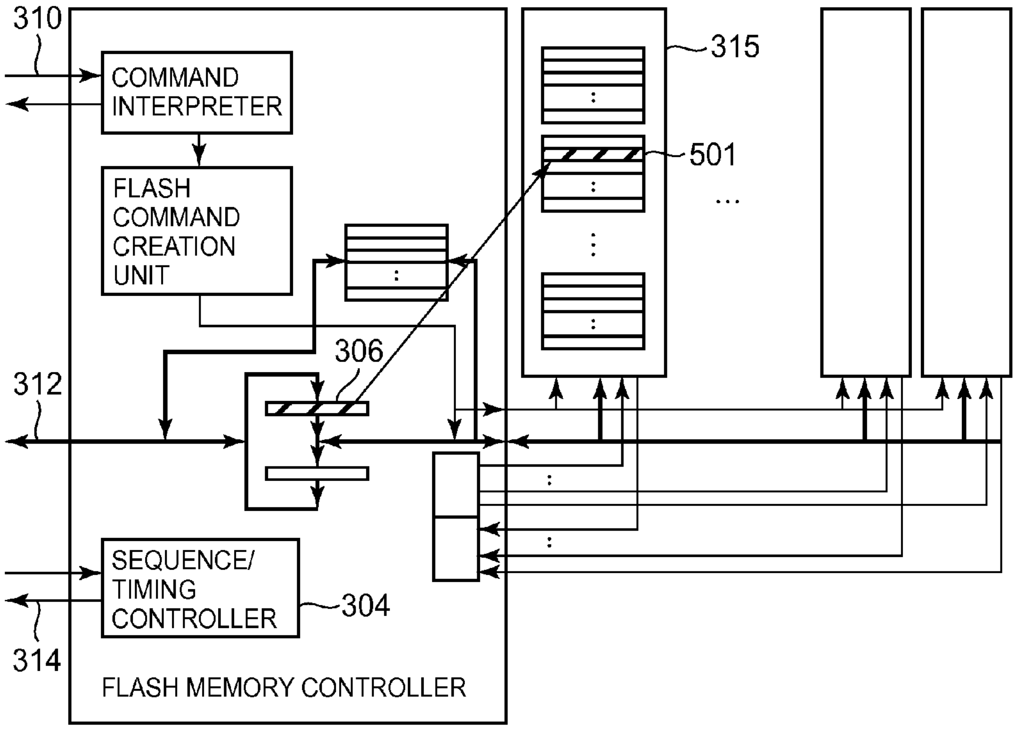
FIG. 5 is a diagram of a single-page write operation.

Next, a single-page write operation will be explained using FIG. 5.

The processor 2006 sends a boot signal 313 to the destination flash memory controller 301 of a write command that specifies a write-destination physical page, and sends the write command 310 and the write-target data element to this flash memory controller 301.

The write-targeted data element is stored in the first page buffer 306 by way of the first data bus 312.

The command interpreter 302 receives the command 310, and specifies the command 310 to be a write command. The flash command creation unit 303 creates a write flash command that corresponds to this write command 310. The write flash command includes address information comprising the following (5-1) to (5-3):

(5-1) number of the physical page 501 of the write destination;

(5-2) number of the physical block including the physical page 501; and (5-3) number of the flash memory chip including the physical block.

The write flash command created by the flash command creation unit 303 is sent to the flash memory chip specified from the above-mentioned (5-3). Further, the write-targeted data element stored in the first page buffer 306 is sent to the flash memory chip. As a result of this, the write-targeted data element is written to the write-destination physical page 501. A status signal 314, which denotes the end of the single-page write operation, is sent to the processor 2006 from the sequence/timing controller 304.

Figure 6:
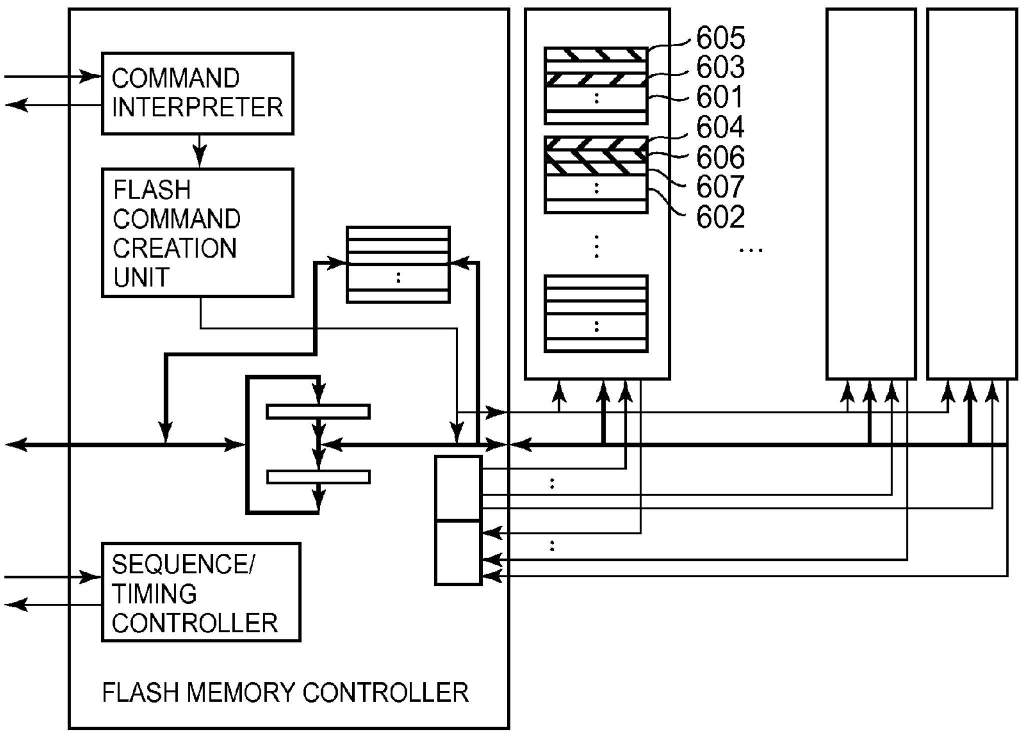
FIG. 6 is a diagram of a process carried out when an update is generated for a valid data element inside a source block.

Processing carried out when an update is generated for a valid data element inside a source block will be explained by referring to FIG. 6.

It is supposed that valid data elements are stored in all source pages of the source block 601. Further, it is supposed that an update block (a deleted block) 602, in which a valid data element is not stored, has been allocated to the source block 601. In this case, when the need arises for the valid data element stored in a certain source page inside the source block 601 to be updated to an update data element, the update data element, rather than the certain source page of the source block 601, is written to a page, which has the newest page address of the pages in which valid data elements are not written in the update block 602. That is, update data elements are written in order from the newest page address.

More specifically, for example, when the valid data element stored in the source page 603 must be updated to an update data element, the processor 2006 sends a write command, which specifies the physical page 604 inside the update block 602 as the write destination of the update data element, to the flash memory controller 301 inside the flash memory module 2003 that has the update block 602. The physical page 604 is the page in which a valid data element is not written, and is the page with the newest page address (the top page according to FIG. 6) in the update block 602. In accordance with this write command, the update data element is written to the physical page 604 by carrying out the single-page write operation explained by referring to FIG. 5.

In this case, for example, a status signal 314, which denotes write end, is sent to the processor 2006 from the flash memory controller 301. The processor 2006, for example, in response to receiving the status signal 314, updates the update page map corresponding to the logical block to which the source block 601 is allocated in the first management table (refer to FIG. 21). More specifically, since the source page 603 is the third physical page inside the source block 601, the bit corresponding to the third physical page is updated in the update page map.

Further, the processor 2006 updates the write location information corresponding to the update block 602 to information denoting that update data elements are written up to the first update page in the second management table (refer to FIG. 22).

In addition, the processor 2006 updates the source page information corresponding to the first page of the update block 602 to information denoting the third page 603 of the source block 601 in the second management table (refer to FIG. 22).

Explanations of the updating of the first and second management tables will be omitted or simplified hereinbelow, but updating like this will be carried out by the processor 2006 every time an update data element is written to the update block 602.

The processor 2006, by referencing the post-update first and second management tables, knows that the valid data element corresponding to the third logical page of the logical block to which the source block 601 has been allocated, exists in the update page 604 inside the update block 602 instead of in the source page 603 inside the source block 601.

Now then, thereafter, when it is necessary that the valid data element stored in the source page 605 inside the source block 601 be updated to an update data element, the processor 2006 sends a write command specifying the update page 606 inside the update block 602 (the update page following update page 604) to the flash memory controller 301 as the write destination of the update data element. Consequently, the update data element is written to the update page 606. Further, the first and second management tables are also updated using the same method as described above.

Thereafter, when it is necessary for the same source page 605 to be updated once again, the processor 2006 sends a write command, which specifies update page 607 (the update page following update page 606) to the flash memory controller 301 as the write destination of the update data element. Consequently, the update data element is written to update page 607. Further, the first and second management tables are also updated using the same method as described hereinabove. As a result of this, the source page information corresponding respectively to the second and third update pages 606 and 607 inside the update block 602 of the second management table, constitutes information denoting the first source page 605 of the source block 601. By referencing the second management table, the processor 2006 knows that the data element stored in the more posterior update page 607 is the valid data element corresponding to the first logical page of the logical block to which the source block 601 has been allocated.

A reclamation process will be explained below.

A reclamation process is a process by which, when valid data elements corresponding to one logical block are distributed among a plurality of physical blocks, the valid data elements distributed among the plurality of physical blocks are collected in one physical block. The reclamation process, for example, is executed when the processor 2006 detects that there is no free update page in the update block allocated to the source block. More specifically, the fact that a free update page does not exist signifies that the write location information (refer to FIG. 22) corresponding to the update block denotes the last update page of the update block.

In this embodiment, a reclamation command, which is a dedicated command for reclamation, is supported. A reclamation process is executed in accordance with a reclamation command issued from the processor 2006 to the flash memory controller 301. Consequently, it is possible to curb a drop in performance when processing an I/O request from the host computer 2009.

That is, in a reclamation process, since a data element read and a data element write are both carried out in page units, for example, when one physical block is configured with 64 pages, the processor 2006 could issue 64 read commands and 64 write commands. This will place a high load on the processor 2006, thereby give rise to the risk of a drop in performance when processing an I/O request from the host computer 2009. In this embodiment, as mentioned hereinabove, a reclamation command that is a dedicated command indicating a reclamation process is supported. Thus, since the processor 2006 does not need to issue a read command and write command in page units for the reclamation process, it is possible to curb the drop in performance when processing an I/O request from the host computer 2009.

The reclamation processing carried out in this embodiment can be broadly divided into two types: an intra-module reclamation process and an inter-module reclamation process.

According to an intra-module reclamation process, the valid data elements corresponding to one logical block inside one flash memory module 2003 are arranged in the first block buffer 305 in order from the newest logical page address, and the rearranged valid data elements are written to a deleted physical block inside the module 2003.

According to an inter-module reclamation process, the valid data elements corresponding to one logical block inside a transfer-source flash memory module (hereinafter referred to as “transfer-source module”) 2003 are arranged in the second block buffer 903 in order from the newest logical page address. The arranged valid data element group is transferred from the transfer-source module 2003 to a transfer-destination flash memory module (hereinafter referred to as “transfer-destination module”) 2003 by way of the second switching mechanism 2002 (refer to FIG. 20). The received valid data element group is written one time to the second block buffer 903 inside the transfer-destination module 2003, and thereafter, is written from the second block buffer 903 to a deleted physical block.

The various reclamation processes will be explained in detail hereinbelow.

<Intra-Module Reclamation Process>

A first intra-module reclamation process will be explained by referring to FIG. 7.

In a first intra-module reclamation process, a plurality of physical blocks 611 and 612, in which valid data elements corresponding to one logical block are stored, and the consolidation-destination physical block 613 of the valid data elements exist in one flash memory chip 614. Physical block 611 is the source block allocated to one logical block, and physical block 612 is the update block allocated to the source block. According to the example of FIG. 7, since one source block 611 is allocated to the one update block 612, the storage capacity of the first block buffer 305 must be at least one physical block worth of storage capacity.

Figure 7:
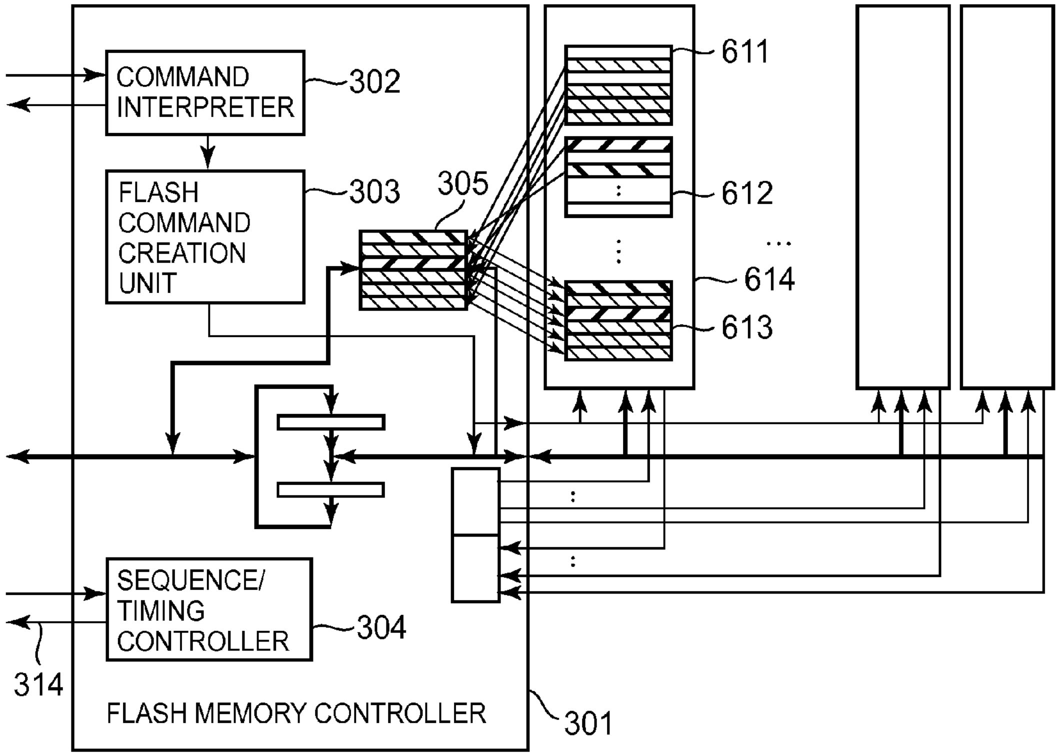
FIG. 7 is a diagram of a reclamation process inside a first module.
Figure 13:
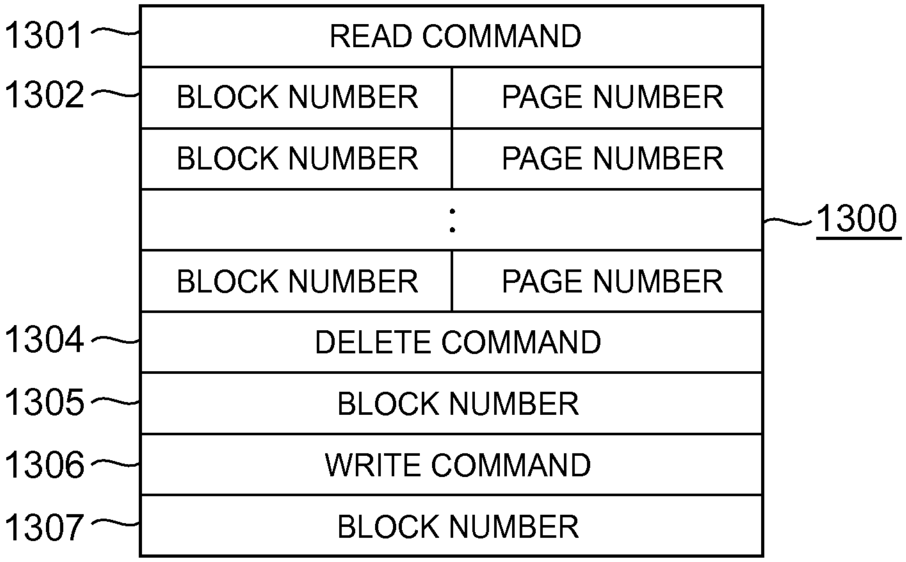
FIG. 13 shows a reclamation command issued in a reclamation process inside the first module.

When one source block 611 is allocated to the update block 612 as shown in FIG. 7, the processor 2006 creates the reclamation command 1300 shown in FIG. 13 based on the first and second management tables. The reclamation command 1300 shown in FIG. 13 includes, in order from the top, a read command 1301, page list 1302, delete command 1304, block number 1305, write command 1306, and block number 1307.

The page list 1302 is a read command 1301 follow-on parameter, and is configured with the block numbers and page numbers denoting the respective read source pages. The respective read source pages correspond to the respective logical pages that configure one logical block, and are the physical pages in which valid data elements exist. As described hereinabove, the processor 2006 can specify the physical page of the physical block in which a valid data element exists by referencing the first and second management tables (strictly speaking, copies of the necessary parts of the first and second management tables stored in the local memory inside the processor 2006). According to the example of FIG. 7, the block number and page number of the first row of the page list 1302 denote the third update page of the update block 612, the block number and page number of the second row denote the second source page of the source block 611, and the block number and page number of the third row denote the top update page of the update block 612.

The block number 1305 is a delete command 1304 follow-on parameter, and denotes the number of a deletion-targeted physical block 613. The block number 1307 is a write command 1306 follow-on parameter, and denotes the physical block 613 from which a data element group is to be deleted.

When the flash memory controller 301 receives a reclamation command 1300 like that described hereinabove, the following processing is carried out.

Figure 15:
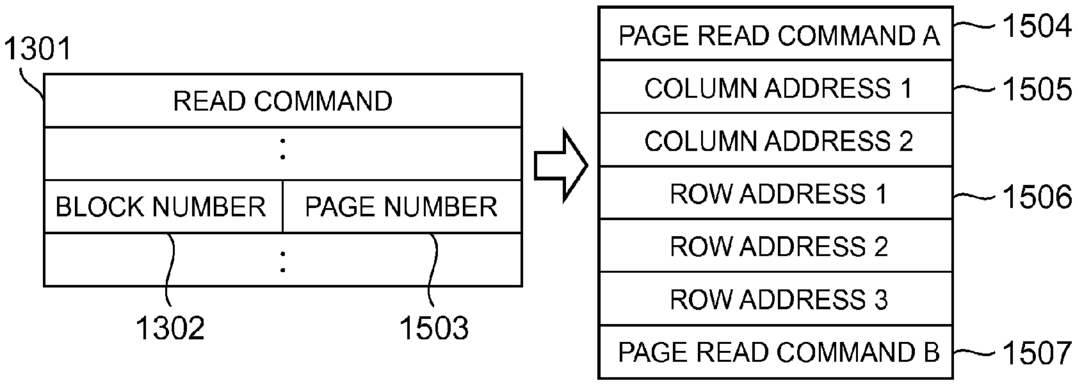
FIG. 15 is a diagram of the creation of a read flash command based on a read command and a page list.

That is, the command interpreter 302 specifies the received command 1300 to be a reclamation command. As shown in FIG. 15, the flash command creation unit 303, in response to the read command 1301 in the reclamation command 1300 and based on the page list 1302, creates a plurality of read flash commands 1500 respectively corresponding to a plurality of read source pages. The created respective read flash commands 1500 are sent to the flash memory chip that has the read source pages specified by the command 1500. One read flash command 1500, for example, is configured with two page read commands 1504 and 1507, and a column address 1505 and row address 1506, which are parameters sandwiched between these commands 1504 and 1507. The column address 1505 and the row address 1506 are calculated using the block number and page number of the page list 1302. In response to the read flash command 1500, a valid data element is read out from the read source page specified by the command 1500. A read-out valid data element is written to the first block buffer 305. The read-out valid data elements are arranged in the first block buffer 305 in order from the newest logical page address.

Next, the flash memory controller 301, in response to the delete command 1304 of the reclamation command 1300, deletes the data element group inside the physical block 613 specified from the block number 1305. More specifically, the flash command creation unit 303 creates a delete flash command for deleting the data element group inside the physical block 613. The created delete flash command is sent to the flash memory chip that has the physical block 613. Consequently, the data element group stored in the physical block 613 is deleted.

Next, the flash memory controller 301, in response to the write command 1306 of the reclamation command 1300, writes the valid data element group stored in the first block buffer 305 to the physical block 613 specified from the block number 1307. More specifically, the flash command creation unit 303 creates a plurality of write flash commands in page units for respectively writing the plurality of valid data elements that configure the valid data element group to a plurality of physical pages inside the physical block 613. The created write flash command is sent to the flash memory chip that has the physical block 613. Consequently, the plurality of valid data elements stored in the first block buffer 305 are written to the physical block 613. Furthermore, since the valid data elements are arranged in the first block buffer 305 in order from the newest logical page address, the valid data elements are sequentially written from the top page of the consolidation-destination physical block 613 in order from the top valid data element of the first block buffer 305.

The flash memory controller 301, when the valid data element group stored in the first block buffer 305 has finished being written to the physical block 613, sends a status signal 314 denoting the end of reclamation command 1300 processing to the processor 2006. Consequently, the processor 2006 knows that reclamation processing has ended.

The above series of processes completes the first intra-module reclamation process. Furthermore, in a variation of the first intra-module reclamation process, the consolidation-destination physical block 613 can exist in a different flash memory chip than flash memory chip 614, and the source block 611 or the update block 612 can exist in a different flash memory chip than flash memory chip 614. That is, in a variation of the first intra-module reclamation process, reclamation can be carried out between a plurality of flash memory chips.

Since one flash memory controller 301 controls a plurality of flash memory chips, processes that are capable of being processed parallelly by the flash memory chips can be carried out in parallel. Further, the reclamation process is carried out for each block, which is the deletion unit, but the command issued to the flash memory chips is a flash command in page units. Therefore, even in the midst of a reclamation process, it is possible to interrupt an I/O command in page units from the processor 2006 based on an I/O request from the host computer 2009.

A second intra-module reclamation process will be explained by referring to FIG. 8.

In a second intra-module reclamation process, a plurality of physical blocks 801 to 803 in which are stored valid data elements corresponding to two logical blocks, and two consolidation-destination physical blocks 804 and 805 respectively corresponding to the two logical blocks exist in different flash memory chips 811 and 812. More specifically, a first source block 801 corresponding to a first logical block, an update block 803, and a second consolidation-destination block 805 corresponding to a second logical block exist in a first flash memory chip 811. Further, a second source block 802 corresponding to the second logical block, and a first consolidation-destination block 804 corresponding to the first logical block exist in a second flash memory chip 812. According to the example of FIG. 8, two source blocks 801 and 802 are allocated to one update block 803, and thus the storage capacity of the first block buffer 305 has to be two physical blocks worth of storage capacity.

Figure 8:
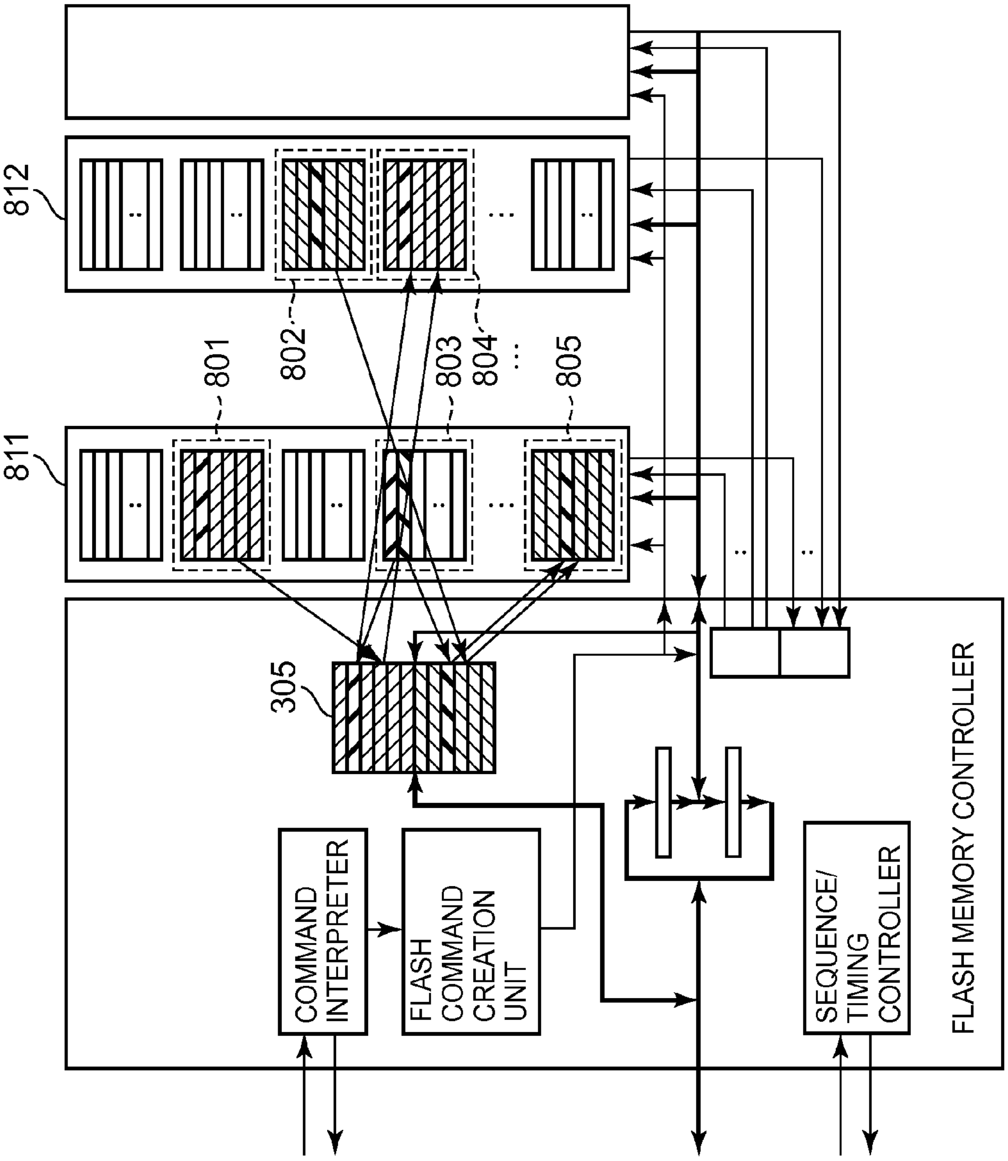
FIG. 8 is a diagram of a reclamation process inside a second module.
Figure 14:
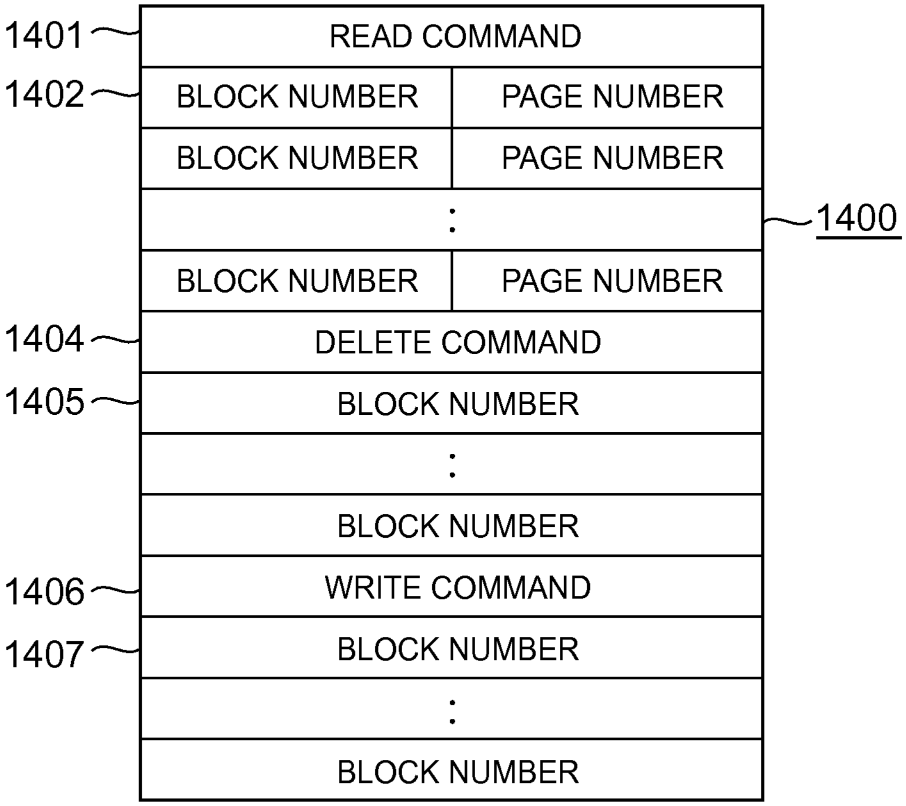
FIG. 14 shows a reclamation command issued in a reclamation process inside the second module.

As shown in FIG. 8, when two (or more) source blocks are allocated to one update block, the processor 2006 creates the reclamation command shown 1400 in FIG. 14 based on the first and second management tables. According to the reclamation command 1400 shown in FIG. 14, the following four points are points of difference with the reclamation command 1300 shown in FIG. 13.

(14-1) The fact that information denoting a large number of read source pages respectively corresponding to a large number of logical pages that configure two logical blocks is recorded in the page list 1402 (the first half of the page list 1402 corresponds to the first logical block, and the second half of the page list 1402 corresponds to the second logical block);

(14-2) the fact that there are two delete command 1404 follow-on block numbers 1405;

(14-3) the fact that there are two write command 1406 follow-on block numbers 1407; and (14-4) the fact that the page list 1402 and both of the block numbers, block number 1405 and block number 1407, also include the flash memory chip address (that is, the fact that information capable of uniquely specifying a block under the control of the flash memory controller 301 is included in the block number).

Based on the first half of the page list 1402 of the reclamation command 1400 of FIG. 14, the respective valid data elements corresponding to the first logical block are read out from the source block 801 and the update block 803 to the first half of the first block buffer 305. The respective valid data elements corresponding to the first logical block are arranged in the first half of the first block buffer 305 in order from the newest logical page address. Similarly, the respective valid data elements corresponding to the second logical block are read out from the source block 802 and the update block 803 to the second half of the first block buffer 305 based on the second half of the page list 1402. The respective valid data elements corresponding to the second logical block are arranged in the second half of the first block buffer 305 in order from the newest logical page address.

Next, the flash memory controller 301, in response to the delete command 1404 of the reclamation command 1400, deletes the data element groups inside the two physical blocks 804 and 805 respectively specified from the two block numbers 1405.

Next, the flash memory controller 301, in response to the write command 1406 of the reclamation command 1400, writes two valid data element groups stored in the first block buffer 305 to the two physical blocks 804 and 805 respectively specified from the two block numbers 1407. More specifically, the valid data element group stored in the first half of the first block buffer 305 is written to the first consolidation-destination block 804, and the valid data element group stored in the second half of the first block buffer 305 is written to the second consolidation-destination block 805.

The second intra-module reclamation process is completed in accordance with the above series of processes. Furthermore, in a variation of the second intra-module reclamation process, the second source block 802 and the first consolidation-destination physical block 804 can exist in flash memory chip 811. That is, in the variation of the second intra-module reclamation process, data elements inside a single flash memory chip can be rearranged.

<Inter-Module Reclamation Process>

A first inter-module reclamation process will be explained by referring to FIGS. 9 and 10. FIG. 9 shows a first flash memory module (hereinafter referred to as "transfer-source module") 2003A, and FIG. 10 shows a second flash memory module (hereinafter referred to as "transfer-destination module") 2003B.

According to the example of FIG. 9, a first flash memory chip 871 of the transfer-source module 2003A has a source block 901 corresponding to a first logical block and an update block 902 allocated to the source block 901. One source block 901 is allocated to the update block 902. The source block 901 or the update block 902 can exist in a different flash memory chip.

Conversely, according to the example of FIG. 10, a consolidation-destination physical block 1002 exists in the transfer-destination module 2003B.

According to the examples of the first inter-module reclamation process shown in FIGS. 9 and 10, since one source block 901 is allocated to one update block 902, the storage capacity of the second block buffer 903, which is used when a valid data element group is transferred between modules, one physical block worth of storage capacity will suffice.

Figure 16:
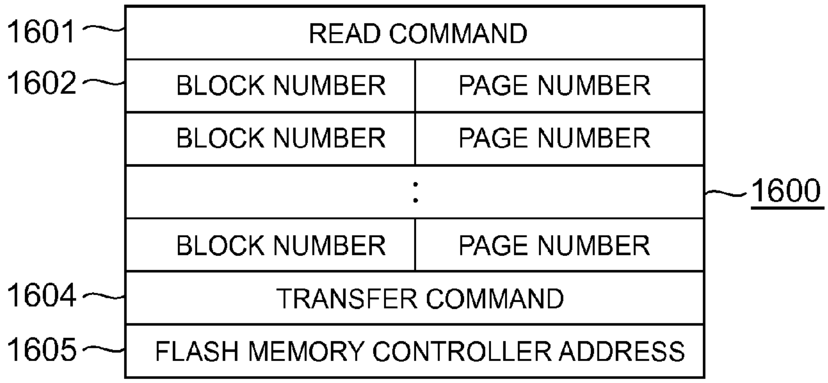
FIG. 16 shows a transfer-source reclamation command issued in a reclamation process with the first module.

In the first inter-module reclamation process, the processor 2006 creates the transfer-source reclamation command 1600 shown in FIG. 16 and the transfer-destination reclamation command 1800 shown in FIG. 18 based on the first and second management tables (refer to FIGS. 21 and 22). The processor 2006 sends the transfer-source reclamation command 1600 to the flash memory controller 301A inside the transfer-source module 2003A, and sends the transfer-destination reclamation command 1800 to the flash memory controller 301B inside the transfer-destination module 2003B.

According to the transfer-source reclamation command 1600 shown in FIG. 16, the points in common with the reclamation command 1300 shown in FIG. 13 are the presence of read command 1601 and page list 1602, and the points of difference are the presence of a transfer command 1604 and a transfer-destination flash memory controller address 1605 in place of the delete command 1304, block number 1305, write command 1306 and block number 1307. The transfer command 1604 is the command that transfers to the transfer-destination module 2003B the valid data element group, which has been read out on the basis of the page list 1603 and arranged in order from the newest logical page address. The transfer-destination flash memory controller address 1605 is a transfer command 1604 follow-on parameter, and denotes the address of the flash memory controller 301B inside the transfer-destination module 2003B.

According to the transfer-destination reclamation command 1800 shown in FIG. 18, the points in common with the reclamation command 1300 shown in FIG. 13 are the presence of delete command 1801, delete command 1801 follow-on block number 1802, write command 1803, and block number 1805 corresponding to the write command 1803, and the points of difference are the lack of a read command 1301 and page list 1302, and the presence of a transfer-source flash memory controller address 1804 for the write command 1803. The transfer-source flash memory controller address 1804 denotes the address of the flash memory controller 301A inside the transfer-source module 2003A.

The transfer-source flash memory controller 301A, upon receiving the transfer-source reclamation command 1600, carries out the following processing.

That is, as shown in FIG. 9, the command interpreter 302A specifies the received command 1600 to be a transfer-source reclamation command. The flash command creation unit 303A, as shown in FIG. 9, creates a plurality of read flash commands respectively corresponding to a plurality of read source pages based on the read command 1601 and page list 1602 of the transfer-source reclamation command 1600, and respectively sends the read flash commands to the flash memory chip that has the read source pages. Consequently, a plurality of valid data elements corresponding to a plurality of logical pages configuring a logical block are read out, and the read-out valid data elements are written to the second block buffer 903A. The plurality of valid data elements are arranged in the second block buffer 903A in order from the newest logical page address.

Next, the flash memory controller 301A, in response to the transfer command 1604 of the transfer-source reclamation command 1600, transfers via the second data bus 904 the valid data element group stored in the second block buffer 903A to the flash memory controller 301B denoted by the transfer-destination flash memory controller address 1605. More specifically, for example, when the command interpreter 302A interprets the transfer command 1604, the sequence/timing controller 304A transfers the valid data element group stored in the second block buffer 903A via the second data bus 904. Furthermore, if the transfer-destination flash memory controller 301B is busy at this time, the fact that the controller 301B is busy is communicated to the processor 2006 from the sequence/timing controller inside the flash memory controller 301B, and if the processor 2006 does not send a cancel command to the transfer-destination flash memory controller 301B, the transfer-destination flash memory controller 301B waits until the valid data element group has been received from the transfer-source flash memory controller 301A.

When the flash memory controller 301A finishes transferring the valid data element group stored in the second block buffer 903A to the flash memory controller 301B (for example, upon receiving a prescribed response from the transfer-source flash memory controller 301B), the flash memory controller 301A sends a status signal 314A, that denotes the end of transfer-source reclamation command 1600 processing, to the processor 2006. Consequently, the processor 2006 knows that the transfer of the valid data element group from the transfer-source module 2003A has ended.

The transferred valid data element group goes by way of the second switching mechanism 2002 (refer to FIG. 20), and is stored in the second block buffer 903B inside the flash memory controller 301B via the second data bus 904 as shown in FIG. 10.

The transfer-destination flash memory controller 301B, in response to the delete command 1801 inside the received transfer-destination reclamation command 1800, deletes the data element group inside the physical block 1002 specified from the block number 1802.

Next, the flash memory controller 301B, in response to the write command 1803 of the transfer-destination reclamation command 1800, determines whether or not the source flash memory controller 301A of the valid data element group stored in the second block buffer 903B is the flash memory controller specified from the transfer-source flash memory controller address 1804. If the determination result is positive, the flash memory controller 301B writes the valid data element group stored in the second block buffer 903B to the physical block 1002 specified from the block number 1805. In so doing, the valid data elements are read out in order from the newest address in the second block buffer 903B, and the read-out valid data elements are written to the consolidation-destination physical block 1002 in order from the newest page address.

When the flash memory controller 301B finishes writing the valid data element group stored in the second block buffer 903B to the physical block 1002, the flash memory controller 301B sends a status signal 314B denoting the end of transfer-destination reclamation command 1800 processing to the processor 2006. Consequently, the processor 2006 knows that the writing of the valid data element group has ended in the transfer-destination module 2003B.

The first inter-module reclamation process is completed in accordance with the above series of processes. Furthermore, the transfer-destination flash memory controller 301B receives the transferred valid data elements if the buffer 903B is free, and upon confirming that the flash memory controller denoted by the transfer-source flash memory controller address 1804 matches the transfer-source flash memory controller 301A, writes the valid data element group stored in the buffer 903B to the specified block (the block denoted by the block number 1805).

The transfer-destination reclamation command 1800 can be sent to the flash memory controller 301B from the transfer-destination flash memory controller 301A instead of the processor 2006. However, as explained hereinabove, when not only the transfer-source reclamation command 1600 but also the transfer-destination reclamation command 1800 are sent from the processor 2006, the processor 2006 can receive status signals and statuses from both the transfer-source module 2003A and the transfer-destination module 2003B. Thus, the processor 2006 knows whether or not operations are being reliably carried out in both the transfer-source module 2003A and the transfer-destination module 2003B.

Furthermore, similar to the intra-module reclamation process, a second inter-module reclamation process in which a plurality of source blocks are allocated to one update block can also be carried out. That is, a plurality of source blocks 901, which are respectively allocated to a plurality of logical blocks, can be allocated to an update block 902 that exists in the transfer-source module 2003A, and a plurality of consolidation-destination physical blocks 1002 respectively corresponding to the plurality of logical blocks can exist in the transfer-destination module 2003B.

In this case, the storage capacities of the second block buffers 903A and 903B have to be equivalent to the storage capacities of the plurality of source blocks allocated to the update block 902.

Further, in this case, the transfer-source reclamation command 1700 shown in FIG. 17 is sent to the transfer-source module 2003A instead of the transfer-source reclamation command 1600 shown in FIG. 16. Meanwhile, the transfer-destination reclamation command 1900 shown in FIG. 19 is sent to the transfer-destination module 2003B instead of the transfer-destination reclamation command 1800 shown in FIG. 18.

According to the reclamation command 1700 shown in FIG. 17, the following two points are points of difference with the transfer-source reclamation command 1600 shown in FIG. 16.

(17-1) The fact that information denoting a large number of read source pages respectively corresponding to a large number of logical pages that configure a plurality of logical blocks is recorded in the page list 1702; and (17-2) the fact that the block number inside the page list 1702 also includes the flash memory chip address.

The transfer-source flash memory controller 301A that receives this transfer-source reclamation command 1700 writes the valid data elements from the plurality of source blocks 901 to the second block buffer 903A based on the page list 1702. As a result of this, the plurality of valid data element groups corresponding to the plurality of logical blocks are stored in the second block buffer 903A. The plurality of valid data element groups are sent from the second block buffer 903A to the flash memory controller 301B, and written to the second block buffer 903B inside the flash memory controller 301B.

Further, according to the transfer-destination reclamation command 1900 shown in FIG. 19, the following three points are points of difference with the transfer-destination reclamation command 1800 shown in FIG. 18.

(19-1) The fact that there is a plurality of delete command 1901 follow-on block numbers 1902;

(19-2) the fact that there is a plurality of write command 1903 follow-on block numbers 1905; and (19-3) the fact that both of the block numbers, block number 1902 and block number 1905, also include the flash memory chip address.

The transfer-destination flash memory controller 301B that receives this transfer-destination reclamation command 1900 deletes the data element groups inside the plurality of consolidation-destination blocks 1002 specified from the plurality of block numbers 1902. Then, the transfer-destination flash memory controller 301B writes the plurality of valid data element groups stored in the second block buffer 903B to the plurality of consolidation-destination blocks 1002 specified from the plurality of block numbers 1905.

Thus, according to the above-described first embodiment, the storage controller is capable of managing a plurality of flash memories in an integrated fashion.

Further, according to the first embodiment, when the storage controller issues a reclamation command to the flash memory controller, the flash memory controller executes a reclamation by which a read or write is generated in page units in response to the reclamation command. Thus, since the storage controller is not required to issue a read command or write command in page units, it is possible to curb a drop in performance when processing an I/O request from the host computer 2009.

Further, according to the first embodiment, a valid data element group is transferred between flash memory modules 2003 via a second switching mechanism 2002 to which the storage controller is not connected. In other words, the transfer of the valid data element group between the flash memory modules 2003 does not go through the first switching mechanism 2001, which links the storage controller and the flash memory modules 2003. Thus, since the path taken by the write-targeted data or read-targeted data in accordance with an I/O request from the host computer 2009 is not under pressure, it is possible to curb a drop in performance when processing an I/O request from the host computer 2009.

Embodiment 2

A second embodiment of the present invention will be explained hereinbelow by referring to FIGS. 11 and 12.

Figure 12:
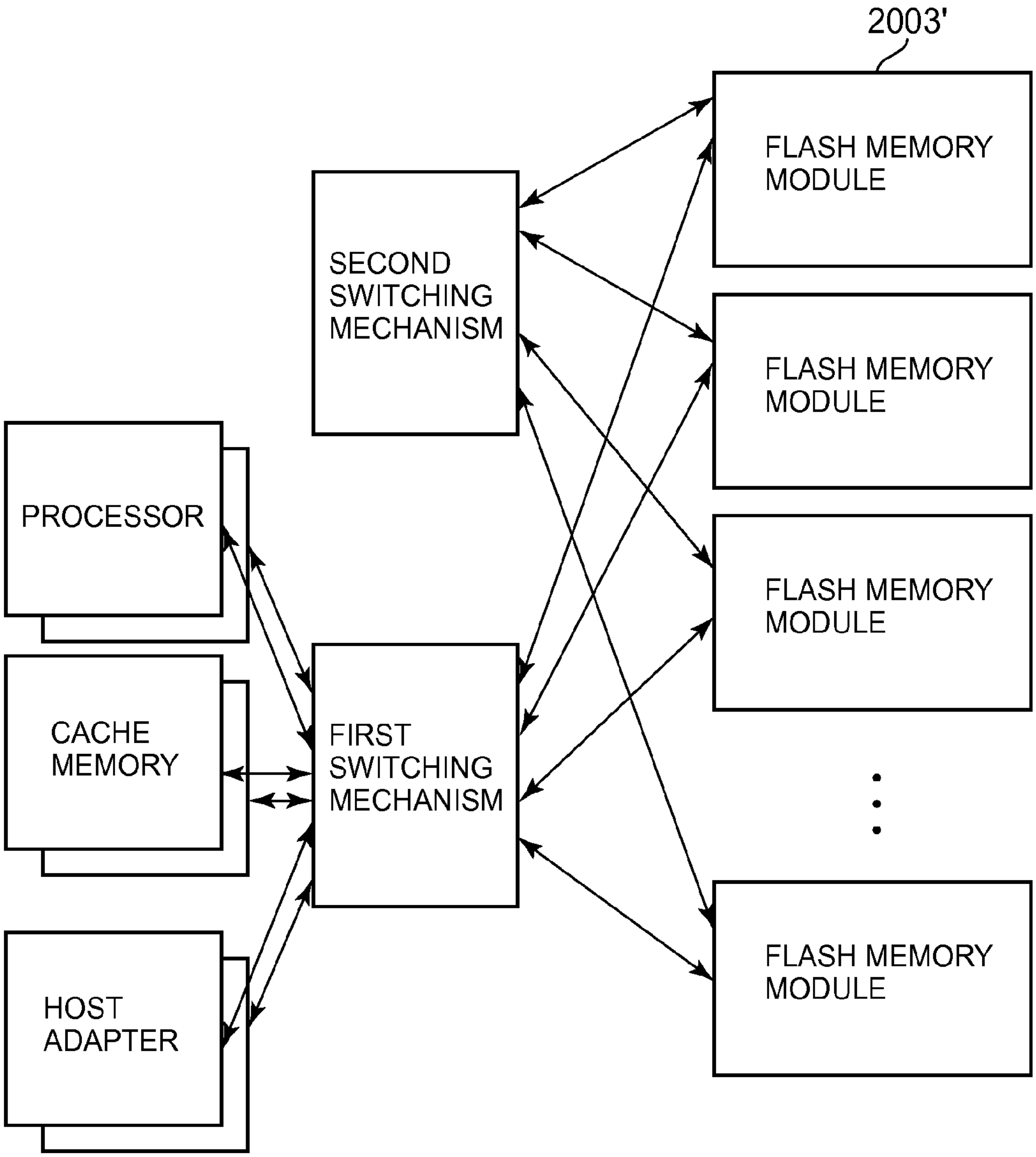
FIG. 12 shows an example of the configuration of an integrated IF flash memory controller comprising a flash memory module of the second embodiment of the present invention.

As shown in FIG. 12, in the second embodiment, a flash memory module 2003' that comprises an integrated IF flash memory controller is used instead of the flash memory module 2003 ("IF" is the abbreviation for interface).

Figure 11:
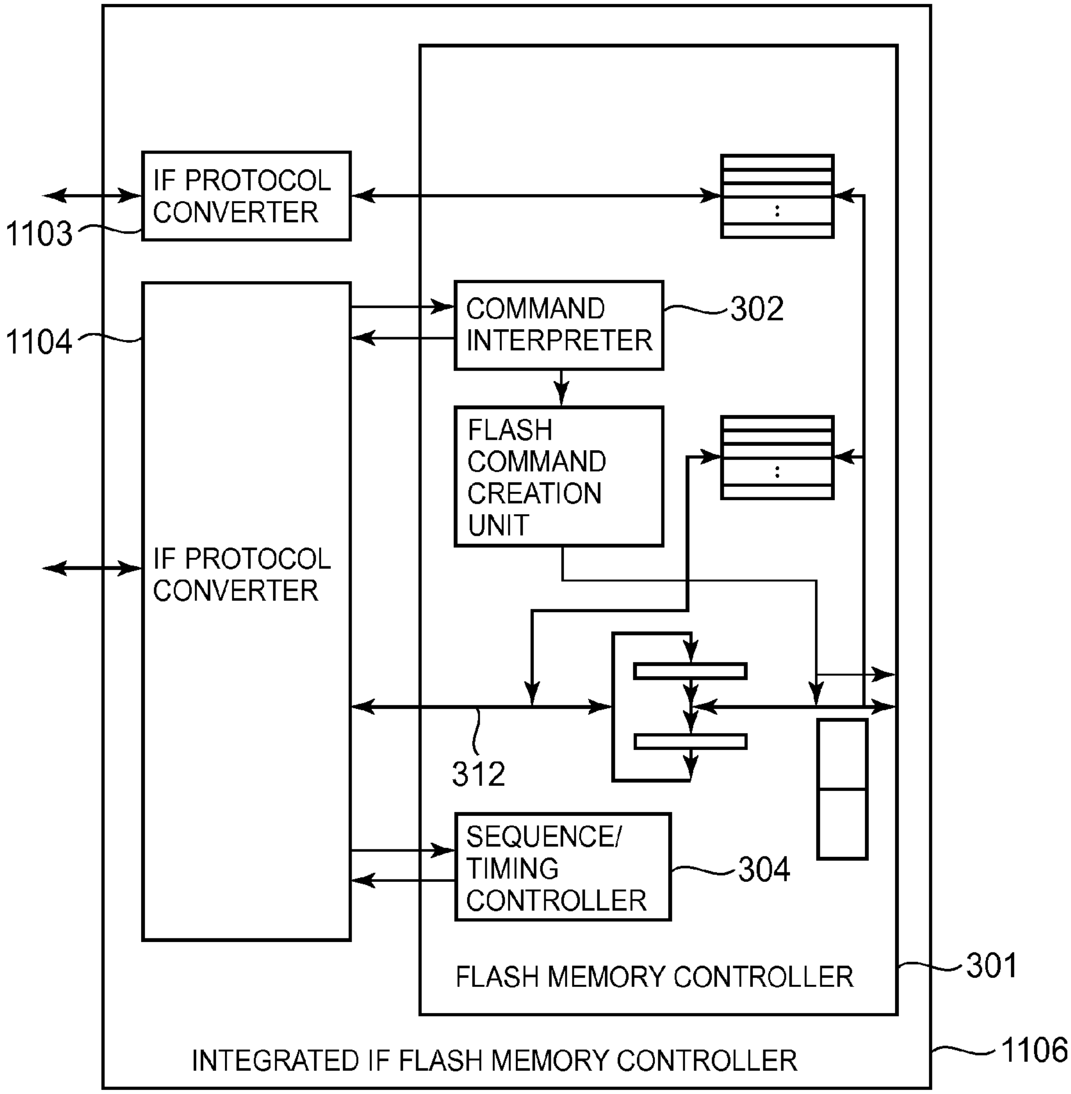
FIG. 11 shows an example of the configuration of a storage system related to a second embodiment of the present invention.

As shown in FIG. 11, the integrated IF flash memory controller 1106 comprises IF protocol converters 1103 and 1104 in addition to the flash memory controller 301. The IF protocol converters 1103 and 1104 are circuits that carry out protocol conversion for high-speed serial communications. IF protocol converter 1103 exists between the second switching mechanism 2002 and the second block buffer 903. IF protocol converter 1104 exists between the first switching mechanism 2001 and the command interpreter 302, first data bus 312, and sequence/timing controller 304.

The IF protocol converters 1103 and 1104 integrate the IF of communications that go through the first switching mechanism 2001 with the IF of communications that go through the second switching mechanism 2002.

A number of preferred embodiments of the present invention have been explained hereinabove, but these are examples for explaining the present invention, and do not purport to limit the scope of the present invention solely to these embodiments. The present invention can be put into practice in a variety of other modes. For example, in the embodiments described above, a reclamation process was given as an example of a data rearrangement process, but a wear-leveling process or other such data rearrangement process is also applicable.

What is claimed is:

1. A storage system, which receives from a higher-level device an I/O request (input/output request) that specifies a logical address of a storage area inside a logical storage resource based on a flash memory, the storage system comprising:

a flash memory module; and a storage controller that receives the I/O request from the higher-level device, and accesses the flash memory module in response to the I/O request, wherein the storage controller comprises:

a storage resource that stores address conversion information denoting a correspondence relationship between a logical address and a physical address of a storage area inside the flash memory; and a processor that uses the address conversion information to specify a physical address corresponding to a logical address specified by the received I/O request, and sends an I/O command including I/O-destination information based on the specified physical address to a memory controller, and the flash memory module comprises:

a flash memory; and a memory controller that receives the I/O command, and carries out an I/O to the storage area inside the flash memory specified from the I/O-destination information of the I/O command, wherein the flash memory comprises a plurality of physical blocks configured with a plurality of physical pages, and when a data element stored in a physical page inside a first physical block is updated to an update data element, the update data element is written to a physical page inside a second physical block that is a deleted physical block allocated to the first physical block, the address conversion information denotes a location of respective valid data elements corresponding to a logical block to which belongs a storage area corresponding to a logical address, and is updated by the processor when an update data element is written to a physical page inside the second physical block allocated to the first physical block corresponding to a first logical block, the processor creates a reclamation command, and sends the reclamation command to the memory controller of the flash memory module, the reclamation command including:

a page list, which is a plurality of page information elements denoting a plurality of read-source physical pages in which are respectively stored a plurality of valid data elements that configure a valid data element group corresponding to the first logical block, and which is created using the address conversion information;

deletion block information denoting a deletion block, which is a physical block from which a data element group is to be deleted; and write-destination block information denoting the deletion block, which constitutes a write destination of the valid data element group, the plurality of read-source physical pages exist in the first physical block and/or the second physical block, and the memory controller comprises a first buffer, and executes the following (3-1) to (3-3):

(3-1) reading out a plurality of valid data elements from the plurality of read-source physical pages specified from the page list, and writing the plurality of valid data elements to the first buffer such that the valid data elements are arranged in the order of logical addresses corresponding to the first logical block;

(3-2) deleting a data element group inside the deletion block specified from the deletion block information; and (3-3) writing a plurality of valid data elements stored in the first buffer to the deletion block specified from the write-destination block information.

2. The storage system according to claim 1, wherein the reclamation command further includes: a read command that has the page list; a delete command that has the deletion block information; and a write command that has the write-destination block information, and the memory controller executes the (3-1) in response to the read command of the reclamation command, executes the (3-2) in response to the delete command of the reclamation command, and executes the (3-3) in response to the write command of the reclamation command.

3. The storage system according to claim 1, wherein the flash memory comprises a plurality of flash memory chips, each flash memory chip comprises a plurality of physical blocks, a plurality of the first physical blocks are allocated to the second physical block, each of page information elements that configure the page list includes information denoting a read-source physical page and information denoting the physical block that has the read-source physical page, and information denoting a physical block that has a read-source physical page, the deletion block information, and the write-destination block information respectively include information denoting a flash memory chip comprising the physical block.

4. The storage system according to claim 1, wherein the flash memory comprises a plurality of flash memory chips, each flash memory chip comprises a plurality of physical blocks, and a physical block that comprises the plurality of read-source physical pages, and the deletion block exist in different flash memory chips.

5. The storage system according to claim 1, wherein a plurality of the first physical blocks are allocated to the second physical block, and a storage capacity of the first buffer is a storage capacity of the plurality of first physical blocks.

6. The storage system according to claim 1, wherein the flash memory comprises a plurality of physical blocks configured with a plurality of physical pages, and when a data element stored in a physical page inside a first physical block is updated to an update data element, the update data element is written to a physical page inside a second physical block that is a deleted physical block allocated to the first physical block, the address conversion information denotes a location of respective valid data elements corresponding to a logical block to which belongs a storage area corresponding to a logical address, and is updated by the processor when an update data element is written to a physical page inside the second physical block allocated to the first physical block corresponding to a first logical block, a plurality of the flash memory modules comprise first and second flash memory modules, a flash memory inside the first flash memory module comprises the first physical block and the second physical block, a flash memory inside the second flash memory module comprises a deletion block, which is a physical block from which a data element group is to be deleted, the processor creates a first reclamation command, and sends the first reclamation command to the first memory controller of the first flash memory module, the first reclamation command includes at least (7-A) and (7-B) of the following (7-A) to (7-D):

(7-A) a page list, which is a plurality of page information elements denoting a plurality of read-source physical pages in which are respectively stored a plurality of valid data elements that configure a valid data element group corresponding to the first logical block, and which is created using the address conversion information;

(7-B) information denoting a second memory controller of the second flash memory module;

(7-C) deletion block information denoting a deletion block, which is a physical block from which a data element group is to be deleted; and (7-D) write-destination block information denoting the deletion block, which constitutes a write destination of the valid data element group, the plurality of read-source physical pages exist in the first physical block and/or the second physical block, the first memory controller has a second buffer A, and executes the following (7-1) and (7-2):

(7-1) reading out a plurality of valid data elements from the plurality of read-source physical pages specified from the information of the (7-A), and writing the plurality of valid data elements to the second buffer A such that the valid data elements are arranged in the order of logical addresses corresponding to the first logical block; and (7-2) transferring a plurality of valid data elements stored in the second buffer A to the second memory controller specified from the information of the (7-B), the information of the (7-C) and (7-D) is sent to the first memory controller or to the second memory controller from the processor, and the second memory controller has a second buffer B, and executes the following (7-3) to (7-5):

(7-3) writing the plurality of valid data element groups transferred from the first memory controller to the second buffer B;

(7-4) deleting a data element group inside the deletion block specified from the information of the (7-C); and (7-5) writing a plurality of valid data elements stored in the second buffer B to the deletion block specified from the information of the (7-D).

7. The storage system according to claim 6, wherein the processor creates a second reclamation command, and sends the second reclamation command to the second memory controller, the first reclamation command does not include the information of the (7-C) and (7-D), and the second reclamation command includes the information of the (7-C) and (7-D).

8. The storage system according to claim 7, wherein the first reclamation command further includes a read command that has the information of the (7-A), and a transfer command that has the information of the (7-B), the second reclamation command further includes a delete command that has the information of the (7-C), and a write command that has the information of the (7-D), the first memory controller executes the (7-1) in response to the read command of the first reclamation command, and executes the (7-2) in response to the transfer command of the first reclamation command, and the second memory controller executes the (7-4) in response to the delete command of the second reclamation command, and executes the (7-5) in response to the write command of the second reclamation command.

9. The storage system according to claim 6, further comprising:

a first switching mechanism to which both the storage controller and the plurality of flash memory modules are connected, and a second switching mechanism to which are connected the plurality of flash memory modules, from among the storage controller and the plurality of flash memory modules, wherein a transfer of the plurality of valid data elements from the first flash memory module to the second flash memory module is carried out by way of the second switching mechanism.

10. The storage system according to claim 6, wherein the flash memory comprises a plurality of flash memory chips, each flash memory chip comprises a plurality of physical blocks, a plurality of the first physical blocks are allocated to the second physical block, each of page information elements that configure the page list includes information denoting a read-source physical page and information denoting the physical block that has the read-source physical page, and information denoting a physical block that has a read-source physical page, the deletion block information, and the write-destination block information respectively include information denoting a flash memory chip comprising the physical block.

11. The storage system according to claim 6, wherein a plurality of the first physical blocks are allocated to the second physical block, and a storage capacity of each of the second buffers A and B is a storage capacity of the plurality of first physical blocks.

12. The storage system according to claim 1, wherein the processor creates a data rearrangement command, and sends the data rearrangement command to the memory controller of the flash memory module, the data rearrangement command including:

a page list that is a plurality of page information elements denoting a plurality of read-source physical pages of a plurality of data elements that configure a data element group corresponding to a first logical block;

deletion block information denoting a deletion block, which is a physical block from which a data element group is to be deleted; and write-destination block information denoting the deletion block, which constitutes a write destination, and the memory controller comprises a first buffer, and executes the following (13-1) to (13-3):

(13-1) reading out a plurality of data elements from the plurality of read-source physical pages specified from the page list, and writing the plurality of data elements to the first buffer;

(13-2) deleting a data element group inside the deletion block specified from the deletion block information; and (13-3) writing a plurality of data elements stored in the first buffer to the deletion block specified from the write-destination block information.

13. The storage system according to claim 1, wherein a plurality of the flash memory modules comprise first and second flash memory modules, a flash memory inside the first flash memory module comprises one or a plurality of physical blocks having a plurality of read-source physical pages of a plurality of data elements that configure a data element group corresponding to a first logical block, a flash memory inside the second flash memory module comprises a deletion block, which is a physical block from which a data element group is to be deleted, the processor creates a first data rearrangement command, and sends the first data rearrangement command to the first memory controller of the first flash memory module, the first data rearrangement command includes at least (14-A) and (14-B) of the following (14-A) to (14-D):

(14-A) a page list that is a plurality of page information elements denoting the plurality of read-source physical pages;

(14-B) information denoting a second memory controller of the second flash memory module;

(14-C) deletion block information denoting a deletion block, which is a physical block from which a data element group is to be deleted; and (14-D) write-destination block information denoting the deletion block, which constitutes a write destination of the data element group, the first memory controller has a second buffer A, and executes the following (14-1) and (14-2):

(14-1) reading out a plurality of data elements from the plurality of read-source physical pages specified from the information of the (14-A), and writing the plurality of data elements to the second buffer A; and (14-2) transferring a plurality of data elements stored in the second buffer A to the second memory controller specified from the information of the (14-B), the information of the (14-C) and (14-D) is sent to the first memory controller or to the second memory controller from the processor, and the second memory controller has a second buffer B, and executes the following (14-3) to (14-5):

(14-3) writing the plurality of data element groups transferred from the first memory controller to the second buffer B;

(14-4) deleting the data element group inside the deletion block specified from the information of the (14-C); and (14-5) writing a plurality of data elements stored in the second buffer B to the deletion block specified from the information of the (14-D).

14. The storage system according to claim 13, wherein the processor creates a second data rearrangement command, and sends the second data rearrangement command to the second memory controller, the first data rearrangement command does not include the information of the (14-C) and (14-D), and the second data rearrangement command includes the information of the (14-C) and (14-D).

15. The storage system according to claim 13, further comprising:

a first switching mechanism to which both the storage controller and the plurality of flash memory modules are connected, and a second switching mechanism to which are connected the plurality of flash memory modules, from among the storage controller and the plurality of flash memory modules, wherein a transfer of the plurality of data elements from the first flash memory module to the second flash memory module is carried out by way of the second switching mechanism.

16. The storage system according to claim 15, wherein the memory controller comprises an integrated interface that integrates interfaces for communications by way of the first switching mechanism and communications by way of the second switching mechanism.

* * * * *